United States Patent
Li et al.

(10) Patent No.: US 9,686,561 B2
(45) Date of Patent: Jun. 20, 2017

(54) INTER-COMPONENT FILTERING

(71) Applicant: QUALCOMM Incorporated, San Diego, CA (US)

(72) Inventors: Xiang Li, San Diego, CA (US); Wei Pu, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 14/301,205

(22) Filed: Jun. 10, 2014

(65) Prior Publication Data

US 2014/0369426 A1    Dec. 18, 2014

Related U.S. Application Data

(60) Provisional application No. 61/836,064, filed on Jun. 17, 2013.

(51) Int. Cl.
| | | |
|---|---|---|
| *H04N 19/80* | (2014.01) | |
| *H04N 19/46* | (2014.01) | |
| *H04N 19/30* | (2014.01) | |
| *H04N 19/186* | (2014.01) | |
| *H04N 19/96* | (2014.01) | |

(52) U.S. Cl.
CPC ........... *H04N 19/46* (2014.11); *H04N 19/186* (2014.11); *H04N 19/30* (2014.11); *H04N 19/80* (2014.11); *H04N 19/96* (2014.11)

(58) Field of Classification Search
CPC ........ H04N 19/46; H04N 19/96; H04N 19/80; H04N 19/30; H04N 19/186
USPC ...................................................... 375/240.29
See application file for complete search history.

(56) References Cited

U.S. PATENT DOCUMENTS

2011/0170608 A1*  7/2011  Shi ........................ H04N 19/147
                                                            375/240.24
2012/0093217 A1*  4/2012  Jeon ........................ H04N 19/46
                                                            375/240.02
(Continued)

FOREIGN PATENT DOCUMENTS

KR    WO 2013025065 A2 *  2/2013   ........ H04N 19/00733

OTHER PUBLICATIONS

Dong et al. "SCE4: Results of test 4.2.4 on chroma enhancement for inter layer prediction". JCTVC-M0183_r2. Date Saved: Apr. 17, 2013, pp. 1-18.*

(Continued)

*Primary Examiner* — Zhihan Zhou
(74) *Attorney, Agent, or Firm* — Knobbe, Martens, Olson & Bear, LLP

(57) ABSTRACT

In one embodiment, an apparatus configured to encode video information includes a memory unit and a processor. The memory unit is configured to store an inter-layer reference picture comprising video information. The processor is operationally coupled to the memory unit. In addition, the processor is configured to partition the inter-layer reference picture into a quadtree structure having a plurality of leafs; determine inter-component filter parameters specific to each individual leaf based upon the video information in each individual leaf and signal the inter-component filter parameters for each of the leafs.

30 Claims, 10 Drawing Sheets

(56) References Cited

U.S. PATENT DOCUMENTS

| | | | | |
|---|---|---|---|---|
| 2012/0106652 | A1* | 5/2012 | Huang | H04N 19/70 375/240.25 |
| 2012/0114034 | A1* | 5/2012 | Huang | H04N 19/70 375/240.03 |
| 2012/0294353 | A1 | 11/2012 | Fu et al. | |
| 2013/0034159 | A1* | 2/2013 | Siekmann | H04N 19/176 375/240.12 |
| 2013/0039423 | A1* | 2/2013 | Helle | H04N 19/197 375/240.13 |
| 2013/0251051 | A1* | 9/2013 | Ikai | H04N 19/0089 375/240.29 |
| 2013/0322523 | A1 | 12/2013 | Huang et al. | |
| 2014/0003495 | A1* | 1/2014 | Chuang | H04N 19/0003 375/240.02 |
| 2014/0192876 | A1* | 7/2014 | Yie | H04N 19/00733 375/240.12 |
| 2015/0117527 | A1* | 4/2015 | Gamei | H04N 19/122 375/240.12 |
| 2015/0249828 | A1* | 9/2015 | Rosewarne | H04N 19/119 375/240.02 |

OTHER PUBLICATIONS

Alshina E., et al., "Non-SCE4: simplified design of cross-color inter-layer filter (test 4.2.4)", 13.JCT-VC Meeting, 104. MPEG Meeting, Apr. 18, 2013-Apr. 26, 2013, Incheon, (Joint Collaborative Team on Video Coding of ISO/IEC JTC1/SC29/WG11 and ITU-T SG.16 ), URL: http://wftp3.itu.int/av-arch/jctvc-site/,,No. JCTVC-M0089, XP030114046, Apr. 2013 (Apr. 9, 2013), 8 pages.

International Search Report and Written Opinion—PCT/US2014/042352—ISA/EPO—Oct. 8, 2014.

Li X., et al., "Non-SCE3: Region Based Inter-layer Cross-Color Filtering", 14. JCT-VC Meeting; Jul. 25, 2013-Feb. 8, 2013, Vienna, (Joint Collaborative Team on Video Coding of ISO/IEC JTC1/SC29/WG11 and ITU-T SG.16, URL: http://wftp3.itu.int/av-arch/jctvc-site/,, No. JCTVC-N0229-v3, XP030114739, Jul. 27, 2013 (Jul. 27, 2017), 14 pages.

Shi Z., et al., "Spatially Scalable Video Coding For HEVC", IEEE Transactions on Circuits and Systems for Video Technology, IEEE Service Center, Piscataway, NJ, US, vol. 22, No. 12, Dec. 1, 2012, (Dec. 1, 2012), XP011487158, ISSN: 1051-8215, pp. 1813-1826.

Bross B., et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v13, 12th Meeting: Geneva, CH, Jan. 14-23, 2013, 331 pages.

Chen J., et al., "CE6.a.4: Chroma intra prediction by reconstructed luma samples", JCTVC-E266, JCTVC meeting, Geneva, Switzerland, Mar. 16-23, 2011, 10 pages.

Chen J., et al., "SHVC Draft Text 1", Joint Collaborative Team on Video Coding (JCT-VC) of ITU-T SG16 WP3 and ISO/IEC JTC1/SC29/WG11 12th Meeting: Geneva, CH, JCTVC-L1008, Jan. 14-23, 2013; pp. 1-33.

Chen J., et al., "SHVC Test Model 1 (SHM1)," JCTVC-L1007, Feb. 2013, pp. 1-42.

Chiu Y-J., et al., "Cross-channel intra chroma residual prediction," JCTVC-G173, Joint Collaborative Team on Video Coding (JCT-VC) of ITU-T SG16 WP3 and ISO/IEC JTC1/SC29/WG11, 7th Meeting: Geneva, CH, Nov. 21-30, 2011, 6 pages.

Dong J., et al., "SCE4: Results of test 4.2.4 on Chroma enhancement for inter layer prediction," Inter Digital Communications, Inc., JCTVC-M0183_r2, Joint Collaborative Team on Video Coding (JCT-VC) of ITU-T SG 16 WP 3 and ISO/IEC JTC 1/SC 29/WG 11, 13th Meeting: Icheon, KR, Apr. 18-26, 2013, pp. 1-18.

Dong J., et al., "Chroma Enhancement for ILR Picture," JCTVC-L0059, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 6 pages.

ITU-T H.264, Series H: Audiovisual and Multimedia Systems, Infrastructure of audiovisual services—Coding of moving video, Advanced video coding for generic audiovisual services, Mar. 2010, 674 pp.

"Joint call for Proposals on Scalable Video Coding Extensions of High Efficiency Video Coding (HEVC)", ISO/IEC JTC1/SC29/WG11 N12957, Jul. 2012, Stockholm, Sweden, 11 pages.

* cited by examiner

INTER-COMPONENT FILTERING

CROSS REFERENCE TO RELATED APPLICATIONS

This application claims the benefit of U.S. Provisional Application No. 61/836,064, filed Jun. 17, 2013, which is incorporated by reference in its entirety.

BACKGROUND

Field

This disclosure is related to the field of video coding and compression. In particular, it is related to scalable video coding (SVC), including SVC for Advanced Video Coding (AVC), as well as SVC for High Efficiency Video Coding (HEVC), which is also referred to as Scalable HEVC (SHVC). It is also related to single layer coding and 3-D video coding, such as the multiview extension of HEVC, referred to as MV-HEVC. In particular, it is related to inter-component filtering and inter-layer prediction in video coding, which may also be referred to as inter-color filtering, cross-color filtering, or inter-component prediction. Various embodiments relate to systems and methods for improved inter-layer prediction signaling and related inter-component filtering processes.

Description of the Related Art

Digital video capabilities may be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Each treeblock may further include both luma and chroma samples (e.g., pixels). Chroma subsampling is the practice of encoding pictures by providing less chroma (e.g., color) information than luma (e.g., brightness) information. Each of the luma and chroma samples in a video sequence may utilize from 8 to 14 bits. Due to the bit requirements, video encoding and decoding systems may implement various methods (e.g., intra-prediction, cross-channel prediction, inter-layer prediction, inter-component filtering) to reduce the number of bits used, and in some cases, to improve picture quality. For example, using inter-component filtering, chroma components used for inter-layer prediction may be enhanced by applying a high-pass filter to corresponding luma components. A system may determine specific filter parameters and transmit (e.g., signal, etc.), receive, and/or use them to determine luma pixels surrounding a Cb or Cr chroma pixel. This may allow such system to determine an enhanced Cb or Cr pixel, respectively. In one embodiment, signaling may include setting a flag in a bitstream at a certain level, e.g., at a largest coding unit, a smallest coding unit, a prediction unit, etc.

Existing video encoding and decoding systems typically signal one set of filter parameters (e.g., one for each color component, Cb and Cr) at the picture layer. In other words, existing systems may signal a set of filter parameters for each color component, but use such set of filter parameters for the corresponding component in the entire picture. Because a picture (e.g., a large resolution picture, such as a 4K picture) may include several regions with different video content, specific filter parameters customized for each region of the picture could provide significant coding benefits. In such case, signaling only one set of filter parameters for an entire picture may not provide the best results and quality may suffer.

To improve quality and coding efficiency, it would be advantageous to provide a device and/or process that determines and signals specific filter parameters for individual regions of a picture, particularly for an inter-layer reference picture. Some advantages of the techniques disclosed herein relate to improving inter-component filtering coding efficiency and inter-layer reference picture quality by partitioning a picture into a quadtree structure having a plurality of leafs, and signaling specific filter parameters for each individual leaf such that parameters can vary between leafs.

SUMMARY

In general, this disclosure describes techniques related to scalable video coding (SVC). Various techniques described below describe methods and devices for improving inter-component filtering and inter-layer prediction, which may also be referred to as inter-color filtering, cross-color filtering, and/or inter-component prediction.

In one embodiment, an apparatus configured to encode video information includes a memory unit and a processor. The memory unit is configured to store an inter-layer reference picture comprising video information. The processor is operationally coupled to the memory unit. In addition, the processor is configured to partition the inter-layer reference picture into a quadtree structure having a plurality of leafs; determine inter-component filter parameters specific to each individual leaf based upon the video information in each individual leaf and signal the inter-component filter parameters for each of the leafs.

In another embodiment, a method of encoding video information includes storing an inter-layer reference picture comprising video information. The method also includes partitioning the inter-layer reference picture into a quadtree structure having a plurality of leafs. The method also includes determining inter-component filter parameters specific to each individual leaf based upon the video information in each individual leaf. The method also includes signaling the inter-component filter parameters for each of the leafs.

In another embodiment, an apparatus configured to encode video information includes a memory unit and a processor. The memory unit is configured to store an inter-layer reference picture comprising video information. The processor is operationally coupled to the memory unit. In addition, the processor is configured to determine partition information indicating a quadtree structure having a plurality of leafs into which the inter-layer reference picture is partitioned; determine inter-component filter parameters specific to each individual leaf, wherein the inter-component filter parameters for each individual leaf are based upon the video information in the individual leaf; and decode the inter-layer reference picture using the partition information and the inter-component filter parameters.

In another embodiment, a method of decoding video information includes storing an inter-layer reference picture comprising video information. The method also includes determining partition information indicating a quadtree structure having a plurality of leafs into which the inter-layer reference picture is partitioned. The method also includes determining inter-component filter parameters specific to each individual leaf, wherein the inter-component filter parameter for each individual leaf are based upon the video information in the individual leaf. The method also includes decoding the inter-layer reference picture using the partition information and the inter-component filter parameters.

In another embodiment, a means for encoding video information is provided. The means for encoding video information comprises: means for storing an inter-layer reference picture comprising video information; means for partitioning the inter-layer reference picture into a quadtree structure having a plurality of leafs; means for determining inter-component filter parameters specific to each individual leaf based upon the video information in each individual leaf; and means for signaling the inter-component filter parameters for each of the leafs.

In another embodiment, a non-transitory computer-readable medium comprises instructions to encode video information that when executed by a processor comprising electronics cause the processor to: partition the inter-layer reference picture into a quadtree structure having a plurality of leafs; determine inter-component filter parameters specific to each individual leaf based upon the video information in each individual leaf; and signal the inter-component filter parameters for each of the leafs.

In another embodiment, a means for decoding video information is provided. The means for decoding video information comprises: means for storing an inter-layer reference picture comprising video information; means for determining partition information indicating a quadtree structure having a plurality of leafs into which the inter-layer reference picture is partitioned; means for determining inter-component filter parameters specific to each individual leaf, wherein the inter-component filter parameter for each individual leaf are based upon the video information in the individual leaf; and means for decoding the inter-layer reference picture using the partition information and the inter-component filter parameters.

In another embodiment, a non-transitory computer-readable medium comprises instructions to decode video information that when executed by a processor comprising electronics cause the processor to: determine partition information indicating a quadtree structure having a plurality of leafs into which the inter-layer reference picture is partitioned; determine inter-component filter parameters specific to each individual leaf, wherein the inter-component filter parameters for each individual leaf are based upon the video information in the individual leaf; and decode the inter-layer reference picture using the partition information and the inter-component filter parameters.

The details of one or more examples are set forth in the accompanying drawings and the description below, which are not intended to limit the full scope of the inventive concepts described herein. Other features, objects, and advantages will be apparent from the description and drawings, and from the claims.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
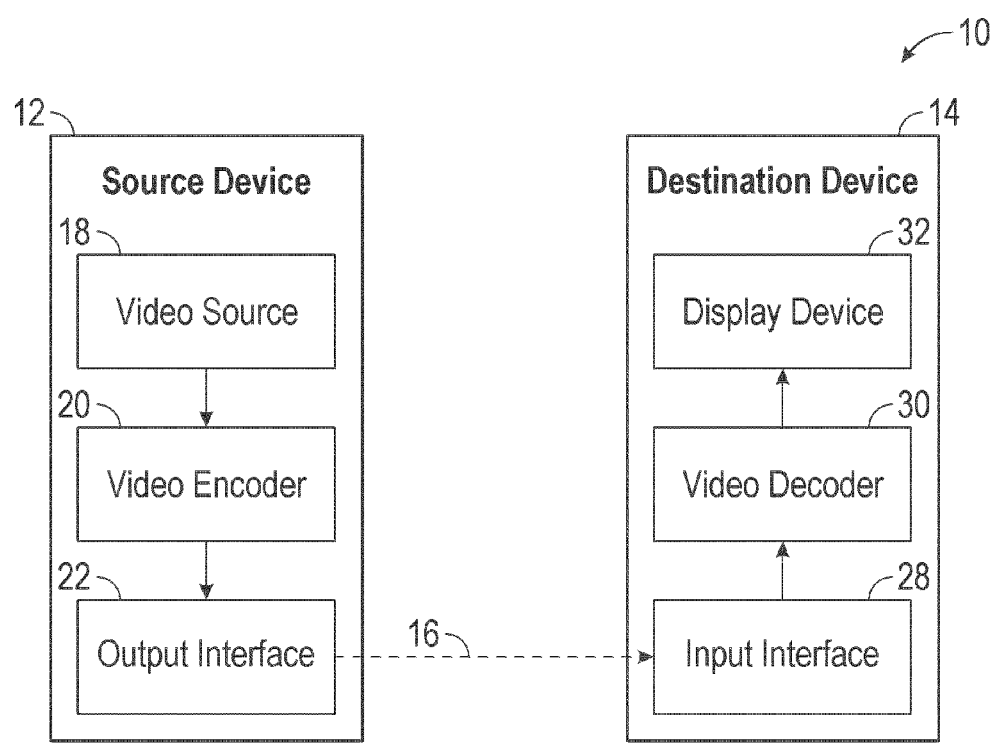
FIG. 1 is a block diagram illustrating an example video encoding and decoding system that may utilize techniques in accordance with aspects described in this disclosure.

The techniques described in this disclosure generally relate to scalable video coding (SHVC, SVC), single layer coding, and/or multiview/3-D video coding. For example, the techniques may be related to, and used with or within, a High Efficiency Video Coding (HEVC) scalable video coding (SVC, sometimes referred to as SHVC) extension. In an SHVC, SVC extension, there may be multiple layers of video information. The layer at the lowest level of the video information may serve as a base layer (BL) or reference layer (RL), and the layer at the very top (or the highest layer) of the video information may serve as an enhanced layer (EL). The "enhanced layer" is sometimes referred to as an "enhancement layer," and these terms may be used interchangeably. The base layer is sometimes referred to as a "reference layer," and these terms may also be used interchangeably. All layers in between the base layer and the top layer may serve as additional ELs and/or reference layers. For example, a given layer may be an EL for a layer below (e.g., that precedes) the given layer, such as the base layer or any intervening enhancement layer. Further, the given layer may also serve as a RL for one or more the enhancement layer(s) above (e.g., subsequent to) the given layer. Any layer in between the base layer (e.g., the lowest layer having, for example, a layer identification (ID) set or equal to "1") and the top layer (or the highest layer) may be used as a reference for inter-layer prediction by a layer higher to the given layer and may use a layer lower to the given layer as a reference for inter-layer prediction. For example, the given layer may be determined using a layer lower to the given layer as a reference for inter-layer prediction.

For simplicity, examples are presented in terms of just two layers: a BL and an EL and/or a RL and an EL; however, it may be well understood that the ideas and embodiments described below are applicable to cases with multiple layers, as well. In addition, for ease of explanation, the terms "frames" or "blocks" are often used. However, these terms are not meant to be limiting. For example, the techniques described below may be used with any of a variety of video units, including but not limited to pixels, blocks (e.g., CU, PU, TU, macroblocks, etc.), slices, frames, picture, etc.

Video Coding

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. The latest joint draft of SVC and MVC is described in "Advanced video coding for generic audio-visual services," ITU-T Recommendation H.264, March 2010. In addition, there is a new video coding standard, High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent High Efficiency Video Coding (HEVC) text specification draft is available from http://phenix.int-evry.fr/jct/doc_end_user/documents/12_Geneva/wg11/JCTVC-L1003-v13.zip. The multiview extension to HEVC, namely MV-HEVC, is also being developed by the JCT-3V. The scalable extension to HEVC, namely SHVC, is also being developed by the JCT-VC.

Scalable Video Coding (SVC), the scalable extension of H.264/AVC, may comprise scalabilities in different dimensions, e.g., enabled in three dimensions. In the time dimension, frame rates with 7.5 Hz, 15 Hz, or 30 Hz may be supported by temporal scalability (T). When spatial scalability (S) is supported, different resolutions such as QCIF, CIF, and 4CIF may be enabled. For each specific spatial resolution and frame rate, the SNR (Q) layers may be added to improve picture quality. Once video content has been encoded in a scalable way, an extractor tool may be used to adapt the actual delivered content according to application requirements. Application requirements may be dependent on, for example, the clients or the transmission channel. In one example, each cubic may contain pictures with the same frame rate (temporal level), spatial resolution, and SNR layers. A better representation may be achieved by adding those cubes (pictures) in any dimension. Combined scalability maybe supported when there are two, three, or even more scalabilities enabled.

According to the SVC specification, the pictures with the lowest spatial and quality layer are compatible with H.264/AVC, and the pictures at the lowest temporal level form the temporal base layer, which may be enhanced with pictures at higher temporal levels. In addition to the H.264/AVC compatible layer, several spatial and/or SNR enhancement layers may be added to provide spatial and/or quality scalabilities. SNR scalability is also referred to as quality scalability. Each spatial or SNR enhancement layer may be temporally scalable, with the same temporal scalability structure as the H.264/AVC compatible layer. For one spatial or SNR enhancement layer, the lower layer it depends on may also be referred to as the base layer of that specific spatial or SNR enhancement layer.

An example of SVC coding structure may include pictures with a lowest spatial and quality layer (e.g., pictures in a layer 0 and a layer 1, with QCIF resolution) that may be compatible with H.264/AVC. Among them, those pictures of the lowest temporal level form the temporal base layer (e.g., those in the layer 0). This temporal base layer (e.g., layer 0) may be enhanced with pictures of higher temporal levels (e.g., layer 1). In addition to the H.264/AVC compatible layer, several spatial and/or SNR enhancement layers may be added to provide spatial and/or quality scalabilities. For instance, the enhancement layer may be a CIF representation with the same resolution as a layer 2. In this example, a layer 3 may be a SNR enhancement layer. Each spatial or SNR enhancement layer itself may be temporally scalable, with the same temporal scalability structure as the H.264/AVC compatible layer. Also, an enhancement layer may enhance both spatial resolution and frame rate. For example, a layer 4 may provide a 4CIF enhancement layer, which may further increase the frame rate from 15 Hz to 30 Hz. Furthermore, coded slices in the same time instance may be successive in a bitstream order and form one access unit in the context of SVC. Those SVC access units may then follow a decoding order, which may be different from the display order and decided, for example, by the temporal prediction relationship.

In general, SVC and SHVC may be used to provide quality (also referred to as signal-to-noise (SNR)) scalability, spatial scalability, and/or temporal scalability. For example, in one embodiment, a reference layer (e.g., a base layer) includes video information sufficient to display a video at a first quality level and the enhancement layer includes additional video information relative to the reference layer such that the reference layer and the enhancement layer together include video information sufficient to display the video at a second quality level higher than the first level (e.g., less noise, greater resolution, better frame rate, etc.). An enhanced layer may have different spatial resolution than a base layer. For example, the spatial aspect ratio between EL and BL may be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

Further in SVC and SHVC, prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information (including motion vectors) of the base layer to predict motion in the enhancement layer. Inter-layer residual prediction uses the residue of the base layer to predict the residue of the enhancement layer.

Some functionalities of SVC are inherited from H.264/AVC. Compared with previous scalable standards, example advantages may include inter-layer prediction and single-loop decoding, as described below.

For example, to keep a low-complexity decoder, single-loop decoding may be used in SVC. With single-loop decoding, each supported layer may be decoded with a single motion compensation loop. To achieve this, the usage of inter-layer intra-prediction may be allowed for enhancement layer macroblocks (MBs), for which a co-located reference layer signal may be intra-coded. Furthermore, layers used to inter-layer predict higher layers may be coded using constrained intra-prediction.

SVC includes inter-layer prediction for spatial and SNR scalabilities based on texture, residue, and motion. Spatial scalability in SVC may be generalized to any resolution ratio between two layers. SNR scalability may be realized by Coarse Granularity Scalability (CGS) or Medium Granularity Scalability (MGS). In SVC, two spatial or CGS layers may belong to different dependency layers (indicated by dependency_id in NAL unit header), while two MGS layers may be in the same dependency layer. One dependency layer may include quality layers with quality_id from 0 to higher values, corresponding to quality enhancement layers. In SVC, inter-layer prediction methods are may be utilized to reduce inter-layer redundancy, as described below.

One example inter-layer prediction method may include inter-layer intra prediction. The coding mode using inter-layer intra prediction may be referred to as "IntraBL" mode in SVC. To enable single-loop decoding, the MBs, which may have co-located MBs in the base layer coded as constrained intra modes, may use the inter-layer intra prediction mode. A constrained intra mode MB may be intra-coded without referring to any samples from neighboring inter-coded MBs.

Another example inter-layer prediction method may include inter-layer residual prediction. For example, if an MB is indicated to use residual prediction, the co-located MB in the base layer for inter-layer prediction may be an inter MB and its residue may be upsampled according to the spatial resolution ratio. The residue difference between the enhancement layer and that of the base layer may be coded. That is, the reconstruction of the current frame, $\hat{I}_e$, of the enhancement layer equals the sum of de-quantized coefficients, $r_e$, of the enhancement layer, the temporal prediction, $P_e$, from the enhancement layer, and the quantization normalized residual coefficients, $r_b$, of the base layer, wherein $\hat{I}_e = r_e + P_e + r_b$.

Yet another example inter-layer prediction method may include inter-layer motion prediction. For example, the co-located base layer motion vectors may be scaled to generate predictors for the motion vectors of MB or MB partition in the enhancement layer. In addition, an MB type (e.g., base mode) may send one flag for each MB. If this flag is true and the corresponding base layer MB is not intra, then motion vectors, partitioning modes and reference indices may be derived from the base layer.

Similar to H.264/AVC, HEVC may also have a scalable video coding extension (SHVC), which may include temporal scalability, SNR scalability, and spatial scalability, as described above.

Overview

As described below, a video frame or picture may be divided into a sequence of treeblocks or largest coding units (LCU), which may represent a largest coding unit in terms of a number of pixels. Each treeblock may be split (e.g., partitioned) into four equal coding units (CUs) according to a quadtree, and each CU may be referred to as a "leaf" or "leaf-CU." Each CU may be further split into four equal sub-CUs, and sub-CUs may also be referred to as leaf-CUs. Each CU may include a coding node and prediction units (PUs) and transform units (TUs) associated with the coding node, as further described below. TUs may comprise coefficients in the transform domain following application of a transform. Following any transforms to produce transform coefficients, a video encoder may quantize the transform coefficients to possibly reduce the amount of data used to represent the coefficients, providing further compression. PUs may enable intra-predictive or inter-predictive coding, which allow a video coding system to save bits (e.g., be more efficient) by predicting portions of a picture based on previous pictures, neighboring pictures, or other portions of the same picture, rather than processing each portion of the picture.

Each treeblock may further include both luma and chroma samples, as further described below. Chroma subsampling is the practice of encoding pictures by providing less chroma (e.g., color) information than luma (e.g., brightness) information. Each of the luma and chroma samples in a video sequence may require from 8 to 14 bits. Due to the bit requirements, video encoding and decoding systems may implement various methods (e.g., intra-prediction, cross-channel prediction, inter-layer prediction, inter-component filtering) to save on bits and in some cases, to improve picture quality.

For example, as further described below, using inter-component filtering, chroma components used for inter-layer prediction may be enhanced by applying a high-pass filter to corresponding luma components. The systems may determine or implement specific high-pass filter coefficients, quantized specific high-pass filter coefficients, quantization parameters, shift parameters, quantization step sizes, among other parameters, collectively referred to in this disclosure as "filter parameters." The filter parameters may be transmitted (e.g., signaled) to luma pixels surrounding a Cb or Cr chroma pixel, which, as described below, may allow the system to obtain an enhanced Cb or Cr pixel, respectively.

Existing video encoding and decoding systems may signal one set of filter parameters (one for each color component, Cb and Cr) at the picture layer. In other words, the existing systems may signal two total sets of filter parameters for the entire picture. As described above, signaling only one set of filter parameters for an entire picture may result in a low-quality picture. For example, a large resolution picture (e.g., 4K, or 3840×2160 pixels) may include several regions with different specific filter parameters. If the system used only one set of filter parameters for each color component for the entire picture, the system may not best capture the properties of the picture and quality may suffer.

As described above and below, the systems and/or methods of this disclosure may improve inter-component filtering coding efficiency and inter-layer reference picture quality by partitioning a picture into a quadtree structure, consisting of four or more leafs, and signaling specific inter-component filter parameters (as discussed above and below in relation to chroma and luma samples) to each leaf. In some embodiments the leafs are quadtree leafs, such as four equal-sized leafs (or quarters). In other embodiments, the leafs have different sizes and may be other than quadtree (e.g., split into two leafs, etc.) Although embodiments described below may be characterized in terms of a quadtree structure, it should be understood that the same techniques may be used with other leaf structures, as well. Such methods avoid having to first divide a picture into largest coding units (LCUs) and then signaling inter-component information at the LCU or smaller level.

For example, the systems and/or methods may partition a 3840×2160 (4K) resolution picture into four equal 1920×1080 quadtree leafs. Optionally, the quadtree leafs may be further partitioned into smaller units (e.g., a smallest coding unit or a largest coding unit or other sized unit), but they need not be. In another embodiment, the method may further partition one or more of the four equal 1920×1080 quadtree leafs into four equal 960×540 quadtree leafs and apply the same steps as described above for each of the quadtree leafs. In another embodiment, the method may further partition one or more of each of the further partitioned quadtree leafs into further equal quadtree leafs of their own, and so on. Any size leaf may be utilized.

The systems and/or methods may determine specific inter-component filter parameters to be used during inter-layer prediction for each of the leafs. The method may signal each of the specific inter-component filter parameters for each of the leafs. The filter parameters may be signaled in a slice header or in an adaptation parameter set (APS). In this way, each of the sampled chroma within the reference layer may integrate this leaf-specific information as appropriate based on the properties of each leaf, resulting in an improved inter-layer reference picture. These features and further embodiments are described in more detail below.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Video Coding System

FIG. 1 is a block diagram that illustrates an example video encoding and decoding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 may provide the video data to the destination device 14 via a communication channel 16, which may include a computer-readable storage medium or other communication channel. Source device 12 and destination device 14 may include a wide range of devices, including desktop computers, notebook (e.g., laptop) computers, tablet computers, set-top boxes, telephone handsets, such as so-called "smart" phones, so-called "smart" pads, televisions, cameras, display devices, digital media players, video gaming consoles, in-car computers, video streaming devices, or the like. Source device 12 and destination device 14 may be equipped for wireless communication.

Destination device 14 may receive the encoded video data to be decoded via communication channel 16. Communication channel 16 may comprise a type of medium or device capable of moving the encoded video data from source device 12 to destination device 14. For example, communication channel 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network, such as the Internet. The communication medium may include routers, switches, base stations, or other equipment that may be useful to facilitate communication from source device 12 to destination device 14.

In some embodiments, encoded data may be output from output interface 22 to a storage device. In such examples, channel 16 may correspond to a storage device or computer-readable storage medium that stores the encoded video data generated by source device 12. For example, destination device 14 may access the computer-readable storage medium via disk access or card access. Similarly, encoded data may be accessed from the computer-readable storage medium by input interface 28. The computer-readable storage medium may include any of a variety of distributed or locally accessed data storage media such as a hard drive, Blu-ray discs, DVDs, CD-ROMs, flash memory, volatile or non-volatile memory, or other digital storage media for storing video data. The computer-readable storage medium may correspond to a file server or another intermediate storage device that may store the encoded video generated by source device 12. Destination device 14 may access stored video data from the computer-readable storage medium via streaming or download. The file server may be a type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through a standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the computer-readable storage medium may be a streaming transmission, a download transmission, or a combination of both.

The techniques of this disclosure may apply applications or settings in addition to wireless applications or settings. The techniques may be applied to video coding in support of a of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some embodiments, system 10 may be configured to support one-way or two-way video transmission to support applications such as video streaming, video playback, video broadcasting, and/or video telephony.

In FIG. 1, source device 12 includes video source 18, video encoder 20, and output interface 22. Destination device 14 includes input interface 28, video decoder 30, and display device 32. Video encoder 20 of source device 12 may be configured to apply the techniques for coding a bitstream including video data conforming to multiple standards or standard extensions. In other embodiments, a source device and a destination device may include other components or arrangements. For example, source device 12 may receive video data from an external video source 18, such as an external camera. Likewise, destination device 14 may interface with an external display device, rather than including an integrated display device.

Video source 18 of source device 12 may include a video capture device, such as a video camera, a video archive containing previously captured video, and/or a video feed interface to receive video from a video content provider. Video source 18 may generate computer graphics-based data as the source video, or a combination of live video, archived video, and computer-generated video. In some embodiments, if video source 18 is a video camera, source device 12 and destination device 14 may form so-called camera phones or video phones. The captured, pre-captured, or computer-generated video may be encoded by video encoder 20. The encoded video information may be output by output interface 22 to a communication channel 16, which may include a computer-readable storage medium, as discussed above.

Computer-readable storage medium may include transient media, such as a wireless broadcast or wired network transmission, or storage media (e.g., non-transitory storage media), such as a hard disk, flash drive, compact disc, digital video disc, Blu-ray disc, or other computer-readable media. A network server (not shown) may receive encoded video data from source device 12 and provide the encoded video data to destination device 14 (e.g., via network transmission). A computing device of a medium production facility, such as a disc stamping facility, may receive encoded video data from source device 12 and produce a disc containing the encoded video data. Therefore, communication channel 16 may be understood to include one or more computer-readable storage media of various forms.

Input interface 28 of destination device 14 may receive information from communication channel 16. The information of communication channel 16 may include syntax information defined by video encoder 20, which may be used by video decoder 30, that includes syntax elements that describe characteristics and/or processing of blocks and other coded units, e.g., GOPs. Display device 32 displays the decoded video data to a user, and may include any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

FIG. 1 is merely an example, and the techniques of this disclosure may apply to video coding settings (e.g., video encoding or video decoding) that do not necessarily include any data communication between the encoding and decoding devices. In other examples, data may be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard and its extension and Version 1 has been finalized. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU). Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred to as a leaf-CU or just a "leaf" In this disclosure, four sub-CUs of a leaf-CU may also be referred to as leaf-CUs even if there is no explicit splitting of the original leaf-CU. For example, if a CU at 16×16 size is not split further, the four 8×8 sub-CUs may also be referred to as leaf-CUs although the 16×16 CU was never split.

A CU comprises a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and may be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU may be square or non-square (e.g., rectangular) in shape.

The HEVC standard allows for transformations according to TUs, which may be different for different CUs. The TUs may be sized based on the size of PUs within a given CU defined for a partitioned LCU, although this may not always be the case. The TUs may be the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence may include a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 may operate on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block may have 16 pixels in a vertical direction (y=16) and 16 pixels in a horizontal direction (x=16). Likewise, an N×N block generally comprises N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete sine transform (DST), a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that may be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

As described above, each treeblock may further include both luma and chroma samples. Chroma subsampling is the practice of encoding pictures by providing less chroma (e.g., color) information than luma (e.g., brightness) information, which takes advantage of the human visual system's lower acuity for color differences than for luminance. For example, in 4:2:2 (e.g., Cb:Cr:Y) sampling, each of the two chroma arrays have the same height (e.g., Cb=2 and Cr=2) and half the width of the luma array (e.g., Y=4). As another example, in 4:2:0 sampling, each of the two chroma arrays have half the height and half the width of the luma array. In yet another example, in 4:4:4 sampling, each of the two chroma arrays may have the same height and width as the luma array, or in other configurations, there may be three color planes each being separately processed as monochrome sampled pictures. For example, in 4:4:4 sampling, if a plane flag (e.g., separate_color_plane_flag), equals 0, each of the two chroma arrays may have the same height and width as the luma array. Otherwise, if the plane flag equals 1, the three color planes may be separately processed as monochrome sampled pictures.

Each of the luma and chroma samples in a video sequence may require from 8 to 14 bits. Due to the bit requirements, video encoding and decoding systems may implement various approaches of prediction (as described above) and filtering to save on bits. In some configurations, the number of bits used in the luma array may differ from the number of bits used in the chroma arrays. For example, when an index (e.g., chroma_format_idc) value equals 1, the nominal vertical and horizontal relative locations of luma and chroma samples in pictures may comprise 3×4 arrays of luma samples surrounding each of a plurality of chroma samples has arranged, for example, in a 4:2:0 sampling. Alternative chroma sample relative locations may be indicated in video usability information, e.g., Annex E of the HEVC standard. As another example, if the value of chroma_format_idc equals 2, the chroma samples may be co-sited with the corresponding luma samples and the nominal locations in a picture may be arranged as in a 4:2:2 sampling. As yet another example, when the value of chroma_format_idc equals 3, the array samples may be co-sited for all cases of pictures and the nominal locations in a picture may be arranged as in a 4:4:4 sampling.

One example inter-component prediction and filtering approach may comprise chroma intra-prediction by reconstructed luma samples. One example inter-component prediction method may be referred to as Linear Model (LM) mode. In LM mode, chroma samples may be predicted from reconstructed luma samples of the same block by a linear model as demonstrated in Equation 1:

$$\text{Pred}_C[x,y] = \alpha \cdot \text{Rec}'_L[x,y] + \beta, \quad (1)$$

where $\text{Pred}_C[x, y]$ may indicate a prediction of chroma samples in a block, $\text{Pred}'_L[x, y]$ may denote the reconstructed luma samples in the block, and parameters $\alpha$ and $\beta$ may be derived from neighboring reconstructed samples.

The sampling ratio of chroma components may be half of that of the luma components and may have a 0.5 pixel phase shift in the vertical direction, e.g., in YUV420 sampling. Reconstructed luma may be down-sampled in the vertical and horizontal directions to match the size and phase of the chroma signal as described in Equation 2, where parameters $\alpha$ and $\beta$ may be derived from neighboring reconstructed samples as described in Equations 3 and 4, respectively.

$$\text{Rec}'_L[x, y] = (\text{Rec}_L[2x, 2y] + \text{Rec}_L[2x, 2y+1]) \gg 1 \quad (2)$$

$$\alpha = \frac{I \cdot \sum_{i=0}^{I} \text{Rec}_C(i) \cdot \text{Rec}'_L(i) - \sum_{i=0}^{I} \text{Rec}_C(i) \cdot \sum_{i=0}^{I} \text{Rec}'_L(i)}{I \cdot \sum_{i=0}^{I} \text{Rec}'_L(i) \cdot \text{Rec}'_L(i) - \left(\sum_{i=0}^{I} \text{Rec}'_L(i)\right)^2} = \frac{A_1}{A_2} \quad (3)$$

$$\beta = \frac{\sum_{i=0}^{I} \text{Rec}_C(i) - \alpha \cdot \sum_{i=0}^{I} \text{Rec}'_L(i)}{I} \quad (4)$$

where $\text{Rec}_c(i)$ and $\text{Rec}_L'(i)$ may indicate reconstructed chroma samples and down-sampled luma samples around the target block and I may indicate a total number of samples of neighboring data.

Furthermore, regarding equations (3) and (4), in some examples, the samples used for the derivation of $\alpha$ and $\beta$ may include the left and above causal samples, which may maintain the total samples number as a power of 2. For example, for a target N×N chroma block, when both left and above causal samples are available, the total involved samples number may be 2N. But when only the left or above causal samples are available, the total involved samples number may be N.

Another example inter-component prediction and filtering process may include cross-channel intra-chroma residual prediction. For example, such process may predict Cr residues based on reconstructed Cb residues. The process may be enabled for all intra blocks, except those coded using the LM mode. No additional control flag may be required. In one example, the process includes: (1) Cr pixels may be predicted by the regular intra chroma prediction mode, wherein for the pixel located at (x, y), the prediction of the Cr pixel may be denoted as $\text{Pred}_{Cr}[x, y]$. Then, (2) if the intra chroma prediction mode during step (1) does not belong to the LM mode, a modified prediction of the Cr pixels may be produced by the reconstructed residual of Cb pixels of the collocated PU. In one example, the prediction formula may be a linear model for the pixel located at (x, y), such that $\text{ModPred}_{Cr}[x, y] = \alpha \cdot \text{ResiRec}'_{Cb}[x, y]$, where $\text{ModPred}_{Cr}$ may be the modified prediction of the Cr pixels and $\text{ResiRec}'_{Cb}$ may be the reconstructed residual value of the Cb pixels. Lastly, (3) the final prediction of the Cr pixel located at (x,y) may be calculated as $\text{FinalPred}_{Cr}[x, y] = \text{Pred}_{Cr}[x, y] + \text{ModPred}_{Cr}[x, y]$, where the parameter a may be a fixed value. In one embodiment, the default value for $\alpha$ may be $$-\frac{1}{2}.$$

In some embodiments, cross-channel chroma residual prediction may not be applied in LM mode.

As another example inter-component prediction and filtering approach, systems may also implement inter-component and/or inter-layer prediction. As further described above, to improve efficiency and quality, chroma components used for inter-layer prediction may be enhanced by applying a high-pass filter to corresponding luma components. For example, a base layer may first be up-sampled to generate a reference layer including the same spatial resolution as an enhancement layer. Then, at the reference layer, each chroma pixel in the inter reference layer may be enhanced by adding an offset to the upsampled chroma values. The offset may be based on the result of filtering the surrounding luma pixels (e.g., 3×4 luma pixels) through the high-pass filter. The high frequency components from the corresponding base layer luma plane allow for a restoration of the enhancement layer chroma edges lost during the corresponding base layer compression.

For each enhancement layer, a system or method may use one high-pass filter for each of the Cb and Cr planes of the inter-layer reference picture. The system or method may determine specific high-pass filter coefficients (e.g., $h_{Cb_{opt}}$ and $h_{Cr_{opt}}$) such that the mean squared error (e.g., MSE) between the original enhancement layer chroma plane and the enhanced chroma plane in the inter-layer reference picture is minimized. For calculating the mean squared error, the system or method may use, for example, a Least Minimum Mean Squared Error (LMMSE) estimator (or other estimator). Example formulas for calculating $h_{cb_{opt}}$ and $h_{cr_{opt}}$ are shown in equations (5) and (6), where Cb, Cr, and Y represent the Cb:Cr:Y (e.g., representing Cb chroma: Cr chroma: luma) portions of the chroma subsampling values, respectively; S represents the corresponding Cb or Cr original enhancement layer value; and x and y represent corresponding chroma and luma pixel positions:

$$h_{Cb_{opt}} = \arg\min_{h_{Cb}} E[(\Sigma_{j=-2}^{1}\Sigma_{i=-1}^{1} h_{Cb}(i,j)Y(2x-i, 2y-j) + Cb(x,y) - S_{Cb}(x,y))^2] \quad (5)$$

$$h_{Cr_{opt}} = \arg\min_{h_{Cr}} E[(\Sigma_{j=-2}^{1}\Sigma_{i=-1}^{1} h_{Cr}(i,j)Y(2x-i, 2y-j) + Cr(x,y) - S_{Cr}(x,y))^2] \quad (6)$$

where Y, Cb, and Cr may represent the three planes in the given inter-layer reference picture.

When using a formula such as those described in equations (5) and (6), $h_{Cb_{opt}}$ and $h_{Cr_{opt}}$ may be real-valued coefficients, which may not be signaled without quantization. The system or method may use a quantizer (e.g., a 16-level uniform quantizer, etc.) to quantize the coefficients. The quantizer may, in some configurations, be controlled by certain parameters, such as a quantization parameter (e.g., $Q_{Cb}$ and $Q_{Cr}$) and/or a shift parameter (e.g., $N_{Cb}$ and $N_{Cr}$). The quantizer may determine a quantization step size, QSS, for example, using equations (7) and (8):

$$QSS_{Cb} = \frac{Q_{Cb}}{2^{N_{Cb}}} \quad (7)$$

$$QSS_{Cr} = \frac{Q_{Cr}}{2^{N_{Cr}}} \quad (8)$$

In some configurations, $h_{cb_{opt}}$ and $h_{cr_{opt}}$ may be approximated using a shorthand equation that incorporates the determined quantization step size, such as in equations (9) and (10):

$$h_{Cb_{opt}}(i,j) = f_{Cb}(i,j) \times QSS_{Cb} \quad (9)$$

$$h_{Cr_{opt}}(i,j) = f_{Cr}(i,j) \times QSS_{Cr} \quad (10)$$

Having been quantized, the determined high-pass filter coefficients (e.g., 3×4 filters with 4-bit precision) may be represented as integers, $f_{Cb}$ and $f_{Cr}$. $f_{Cb}$ and $f_{Cr}$ may have a dynamic range, for example, from −8 to 7 (e.g., a 4-bit representation with 12 values).

The quantized filter coefficients, quantization parameters, and shift parameters may be referred to collectively as filter parameters. The filter parameters may be transmitted in a slice header, which may further include a binary flag indicating whether the header may be used for each chroma plane. In some configurations, for each of the two chroma planes, 65 bits may be used to signal the filter parameters. For example, the 65 bits may include: a 1-bit flag; 3×4 filter coefficients, each with 4-bit precision, totaling 48 bits; an 11-bit quantization parameter (10 bits representing magnitude and 1 bit representing a sign), e.g., $Q_{Cb}$; and a 5-bit shift parameter, e.g., $N_{Cb}$. For higher level syntax, one binary flag may be added to a sequence parameter set (SPS) to indicate whether the proposed tool may be used in the current coded video sequence. In other configurations, an additional 1-bit binary flag may be included to indicate whether the header may be used in a current coded video sequence. In other embodiments, filter shape adaptation based on color format may be used. In further embodiments, to increase efficiency, an 8-point cross-shape filter format (rather than 3×4 filter coefficients) may be used. In other embodiments, any of a variety of filters may be used.

One or more of the filter parameters may be signaled to enhance, for example, a Cb chroma pixel and/or a Cr chroma pixel, surrounded by luma pixels, in an inter-layer reference picture. For example, $f_{Cb}$ and $f_{Cr}$ may be signaled, generating a chroma offset intermediate value (e.g., z(x, y)), as shown in equations (11) and (12), where x and y represent pixel position:

$$z(x, y)_{Cb} = \sum_{j=-2}^{1}\sum_{i=-1}^{1} f_{Cb}(i, j)Y(2x - i, 2y - j) \quad (11)$$

$$z(x, y)_{Cr} = \sum_{j=-2}^{1}\sum_{i=-1}^{1} f_{Cr}(i, j)Y(2x - i, 2y - j) \quad (12)$$

The chroma offset intermediate value, z(x, y), may then be scaled to a normal range chroma offset intermediate value (e.g., o(x, y)) using the quantization step size value and a comparison of z(x, y) with the quantization parameters. The enhanced pixels may then be represented by $Cb_{enh}(x, y)$ and $Cr_{enh}(x, y)$ and calculated as shown in equations (13) and (14), where Cb(x, y) and Cr(x, y) represent upsampled chroma values for a Cb and Cr chroma pixel, respectively.

$$Cb_{enh}(x,y) = Cb(x,y) + o(x,y) \quad (13)$$

$$Cr_{enh}(x,y) = Cr(x,y) + o(x,y) \quad (14)$$

Existing video encoding and decoding systems and methods signal only one set of filter parameters (e.g., one for each color component, Cb and Cr) at the picture layer and apply each set to the entire picture. In other words, the existing systems may signal a single set of filter parameters for the Cb component, and use the same set of parameters to determine all of the Cb components in the entire picture. Similarly, a single set of filter parameters for the Cr component may be signaled for a picture, and the same Cr filter parameters may be used to determine all of the Cr components in the entire picture. As described above, signaling only one set of filter parameters for an entire picture may result in a low-quality picture. For example, a large resolution picture (e.g., 4K, or 3840×2160 pixels, etc.) may include several regions having different content for which different filter parameters would be useful. If the system used only one set of filter parameters for each color component for the entire picture, the system may not provide the best picture quality.

As described above and below, the systems and methods of this disclosure improve inter-component filtering coding efficiency (e.g., saving on complexity and signaling costs) and inter-layer reference picture quality (e.g., enhancing chroma pixels) by one or more of determining an inter-layer reference picture, partitioning the inter-layer reference picture into a plurality of leafs, determining specific filter parameters for each individual leaf, signaling specific filter parameters for each individual leaf, and/or decoding and enhancing the inter-layer reference picture using the specific partition information and specific filter parameters, as discussed above and below. Furthermore, some embodiments may implement filter shape adaptation based on a color format.

Video Encoder

Figure 2A:
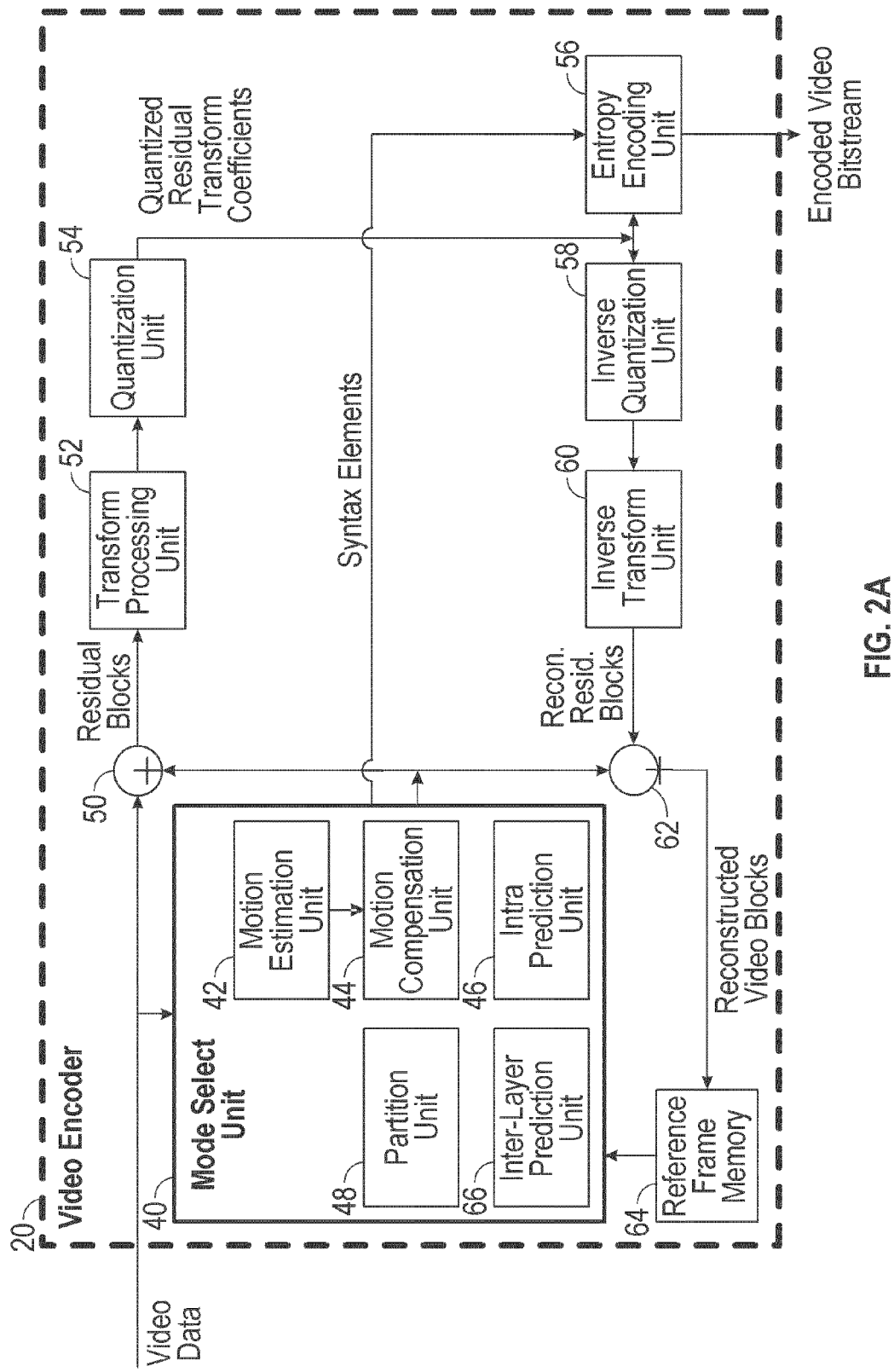
FIG. 2A is a block diagram illustrating an example of a video encoder that may implement techniques in accordance with aspects described in this disclosure.

FIG. 2A is a block diagram illustrating an example of a video encoder that may implement techniques in accordance with aspects described in this disclosure. Video encoder 20 may be configured to process a single layer of a video bitstream, such as for HEVC. Further, the video encoder 20, may be configured to perform any or all of the techniques of this disclosure, including but not limited to determining an inter-layer reference picture, partitioning the inter-layer reference picture into a plurality of leafs, determining specific filter parameters for each individual leaf, signaling the specific filter parameters for each individual leaf, and/or other methods of performing inter-component filtering, inter-layer prediction, and related processes described in greater detail above and below with respect to FIGS. 4A, 4B, 5A, 5B, and 6. In some embodiments, an inter-layer prediction unit 66 (as further described below) may perform one or all of the techniques. In another embodiment, the inter-layer prediction unit 66 may work in combination with a partition unit 48 (as further described below) when performing one or all of the techniques. One or all of the techniques may be used to enhance an inter-layer reference picture quality, for example, by up sampling chroma pixels using specific filter parameters for each individual leaf, as described above and below. In some embodiments, the filter parameters may include one or more of filter coefficients, quantization parameters, shift parameters, or any other parameters, as further discussed above and below. However, aspects of this disclosure are not so limited. In some examples, the techniques described in this disclosure may be shared among the various components of video encoder 20. In some examples, additionally or alternatively, a processor (not shown) may be configured to perform any or all of the techniques described in this disclosure.

For purposes of explanation, this disclosure describes video encoder 20 in the context of SVC and/or HEVC coding. However, the techniques of this disclosure may be applicable to other coding standards or methods. The encoder 20 of FIG. 2A illustrates a single layer of a codec. However, as will be described further with respect to FIG. 2B, some or all of the video encoder 20 may be duplicated for processing according to a multi-layer codec.

Video encoder 20 may perform intra-, inter-, and inter-layer prediction (sometime referred to as intra-, inter- or inter-layer coding) of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Inter-layer coding relies on prediction based video within a different layer(s) within the same video coding sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2A, video encoder 20 receives a current video block within a video frame to be encoded. In the example of FIG. 2A, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, inter-layer prediction unit 66, and partition unit 48. Reference frame memory 64 may include a decoded picture buffer. The decoded picture buffer is a broad term having its ordinary meaning, and in some embodiments refers to a video codec-managed data structure of reference frames.

For video block reconstruction, video encoder 20 also includes inverse quantization unit 58, inverse transform unit 60, and summer 62. A deblocking filter (not shown in FIG. 2A) may also be included to filter block boundaries to remove blockiness artifacts from reconstructed video. If desired, the deblocking filter may filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization, etc.). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra, inter, or inter-layer prediction mode, e.g., based on error results, and provide the resulting intra-, inter-, or inter-layer coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In some embodiments, motion estimation unit 42 may perform motion estimation relative to luma components, and motion compensation unit 44 may use motion vectors calculated based on the luma components for both chroma components and luma components. Mode select unit 40 may generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

The video encoder 20 may include an inter-layer prediction unit 66. Inter-layer prediction unit 66 is configured to predict a current block (e.g., a current block in the EL) using one or more different layers that are available in SVC (e.g., a base or reference layer). Such prediction may be referred to as inter-layer prediction. Inter-layer prediction unit 66 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. When the base and enhancement layers have different spatial resolutions, spatial motion vector scaling and/or inter-layer position mapping using a temporal scaling function may be performed by the inter-layer prediction unit 66, as described in greater detail below.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. For example, discrete sine transforms (DST), wavelet transforms, integer transforms, sub-band transforms or other types of transforms may also be used.

Transform processing unit 52 may apply the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain (e.g., for later use as a reference block). Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Multi-Layer Video Encoder

Figure 2B:
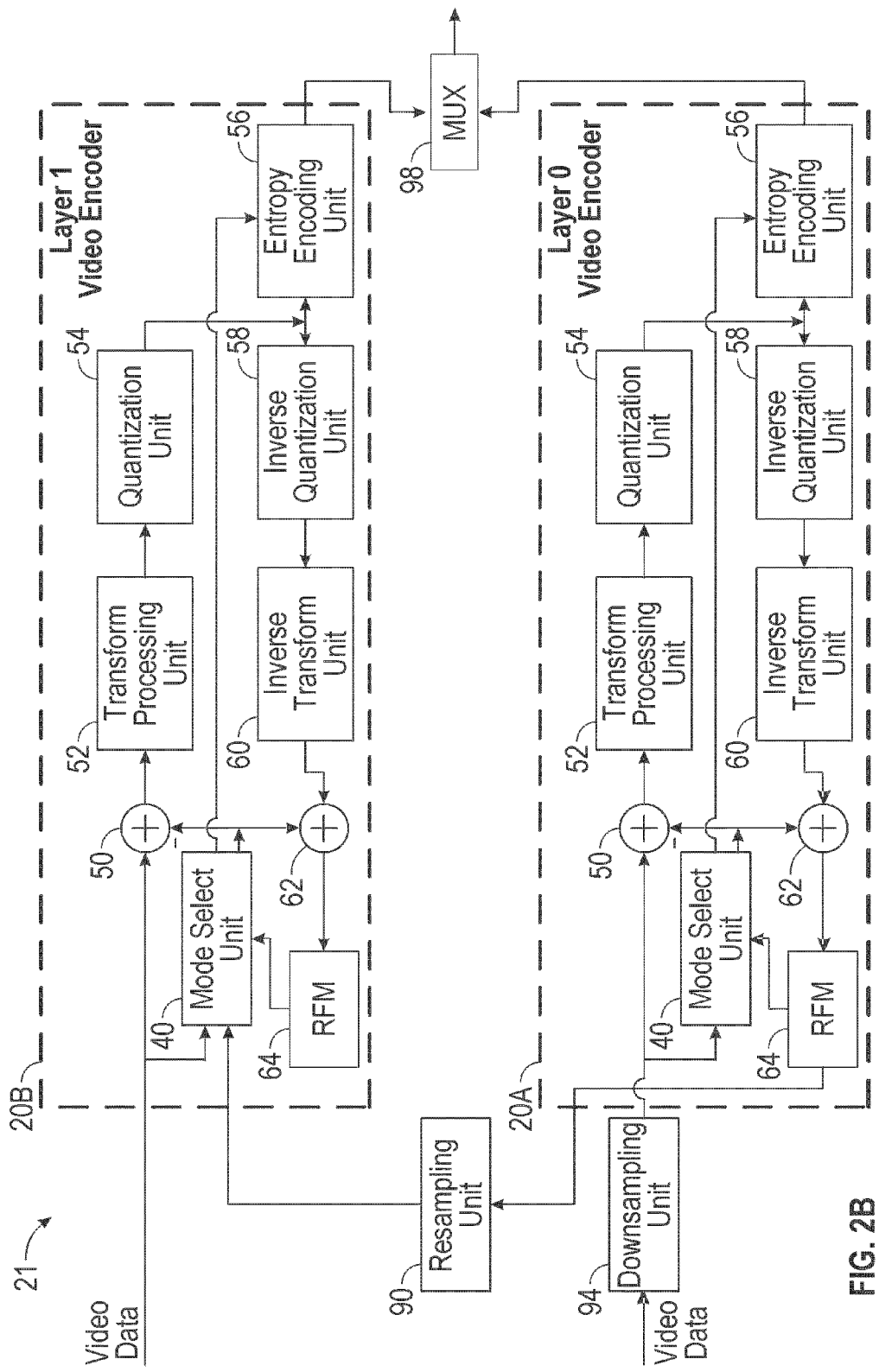
FIG. 2B is a block diagram illustrating an example of a multi-layer video encoder that may implement techniques in accordance with aspects described in this disclosure.

FIG. 2B is a block diagram illustrating an example of a multi-layer video encoder 21 that may implement techniques in accordance with aspects described in this disclosure. The video encoder 21 may be configured to process multi-layer video frames, such as for SHVC and multiview coding. Further, the video encoder 21 may be configured to perform any or all of the techniques of this disclosure.

The video encoder 21 includes a video encoder 20A and video encoder 20B, each of which may be configured as the video encoder 20 of FIG. 2A and may perform the functions described above with respect to the video encoder 20. Further, as indicated by the reuse of reference numbers, the video encoders 20A and 20B may include at least some of the systems and subsystems as the video encoder 20, such as a reference frame memory ("RFM") 64, which may further include a decoded picture buffer and may be referred to as the "reference frame memory (decoded picture buffer) 64." Although the video encoder 21 is illustrated as including two video encoders 20A and 20B, the video encoder 21 is not limited as such and may include any number of video encoder 20 layers. In some embodiments, the video encoder 21 may include a video encoder 20 for each picture or frame in an access unit. For example, an access unit that includes five pictures may be processed or encoded by a video encoder that includes five encoder layers. In some embodiments, the video encoder 21 may include more encoder layers than frames in an access unit. In some such cases, some of the video encoder layers may be inactive when processing some access units.

In addition to the video encoders 20A and 20B, the video encoder 21 may include a resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may upsample the spatial size or number of pixels of the base layer, but the number of slices or the picture order count may remain constant. In some cases, the resampling unit 90 may not process the received video and/or may be optional. For example, in some cases, the mode select unit 40 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled. Resampling unit 90 may be further configured to perform cropping and/or padding operations, as well.

The resampling unit 90 may be configured to receive a picture or frame (or picture information associated with the picture) from the reference frame memory (decoded picture buffer) 64 of the lower layer encoder (e.g., the video encoder 20A) and to upsample the picture (or the received picture information). This upsampled picture may then be provided to the mode select unit 40 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the reference frame memory (decoded picture buffer) 64 of the video encoder 20A may be provided directly, or at least without being provided to the resampling unit 90, to the mode select unit 40 of the video encoder 20B. For example, if video data provided to the video encoder 20B and the reference picture from the reference frame memory (decoded picture buffer) 64 of the video encoder 20A are of the same size or resolution, the reference picture may be provided to the video encoder 20B without any resampling.

In some embodiments, the video encoder 21 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 21 may further include a multiplexor 98, or mux. The mux 98 can output a combined bitstream from the video encoder 21. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 21, such as from a processor on the source device 12. The control signal may be generated based on the resolution or bitrate of a video from the video source 18, based on a bandwidth of the channel 16, based on a subscription associated with a user (e.g., a paid subscription versus a free subscription), or based on any other factor for determining a resolution output desired from the video encoder 21.

Video Decoder

Figure 3A:
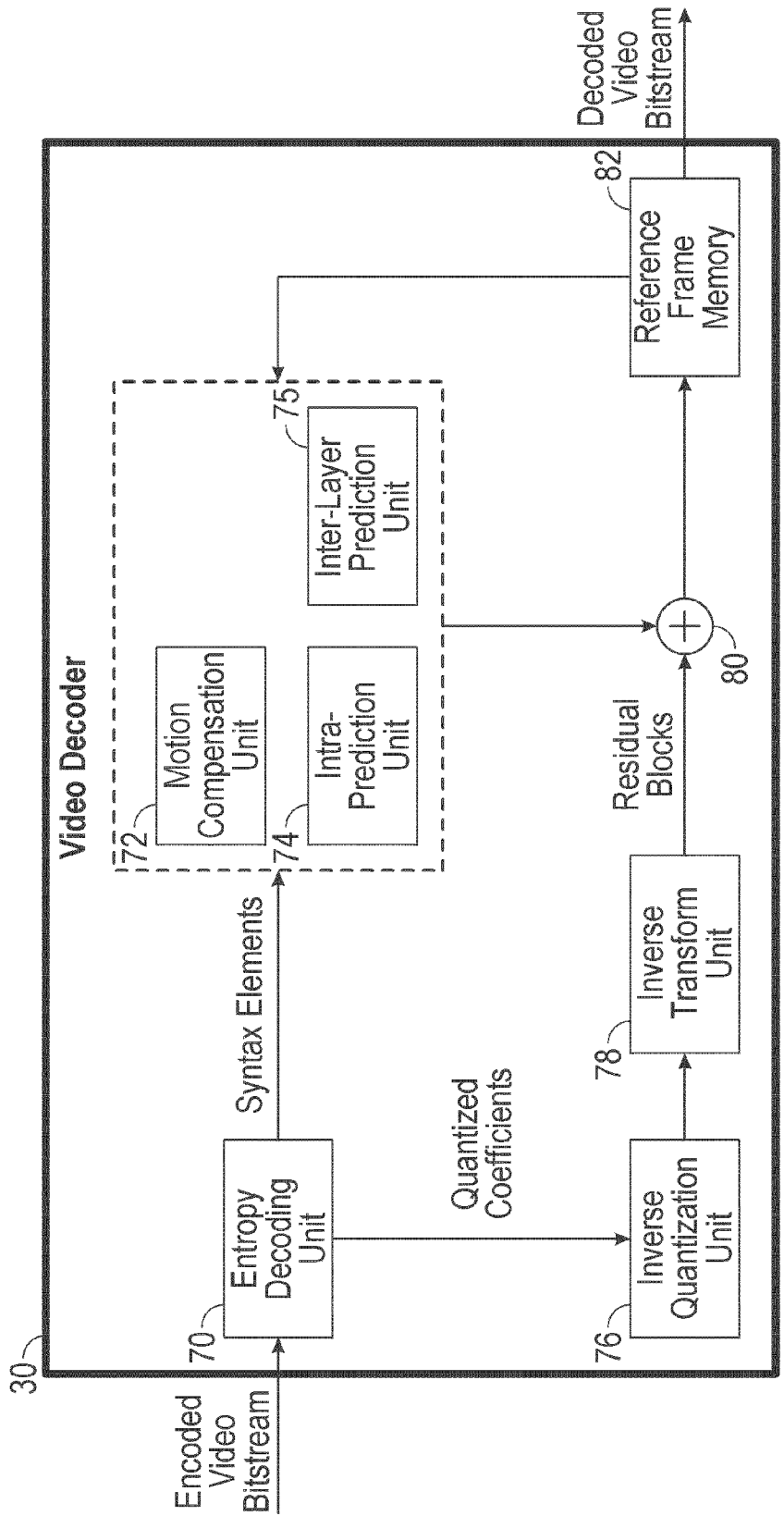
FIG. 3A is a block diagram illustrating an example of a video decoder that may implement techniques in accordance with aspects described in this disclosure.

FIG. 3A is a block diagram illustrating an example of a video decoder that may implement techniques in accordance with aspects described in this disclosure. The video decoder 30 may be configured to process a single layer of a video bitstream, such as for HEVC.

Further, the video decoder 30 may be configured to perform any or all of the techniques of this disclosure, including but not limited to receiving an inter-layer reference picture partition information identifying individual leafs of the inter-layer reference picture, receiving specific filter parameters for each individual leaf, and decoding and enhancing the inter-layer reference picture using the specific partition information and specific filter parameters, and/or other methods of performing inter-component filtering, inter-layer prediction, and related processes described in greater detail above and below with respect to FIGS. 4A, 4B, 5A, 5B, and 7. In some embodiments, an inter-layer prediction unit 75 (as further described below) may perform one or all of the techniques. One or all of the techniques may be used to enhance an inter-layer reference picture quality, for example, by up sampling chroma pixels using specific filter parameters for each individual leaf, as described above and below. In some embodiments, the filter parameters may include one or more of filter coefficients, quantization parameters, shift parameters, or any other parameters, as further discussed above and below. However, aspects of this disclosure are not so limited. In some examples, the techniques described in this disclosure may be shared among the various components of video decoder 30. In some examples, additionally or alternatively, a processor (not shown) may be configured to perform any or all of the techniques described in this disclosure.

For purposes of explanation, this disclosure describes video decoder 30 in the context of HEVC coding. However, the techniques of this disclosure may be applicable to other coding standards or methods. The decoder 30 of FIG. 3A illustrates a single layer of a codec. However, as will be described further with respect to FIG. 3B, some or all of the video decoder 30 may be duplicated for processing according to a multi-layer codec.

In the example of FIG. 3A, video decoder 30 includes an entropy decoding unit 70, motion compensation unit 72, intra prediction unit 74, inter-layer prediction unit 75, inverse quantization unit 76, inverse transformation unit 78, reference frame memory 82, and summer 80. In some embodiments, motion compensation unit 72 and/or intra prediction unit 74 may be configured to perform inter-layer prediction, in which case the inter-layer prediction unit 75 may be omitted. Video decoder 30 may, in some examples, perform a decoding pass generally reciprocal to the encoding pass described with respect to video encoder 20 (FIG. 2A). Motion compensation unit 72 may generate prediction data based on motion vectors received from entropy decoding unit 70, while intra-prediction unit 74 may generate prediction data based on intra-prediction mode indicators received from entropy decoding unit 70. Reference frame memory 82 may include a decoded picture buffer. The decoded picture buffer is a broad term having its ordinary meaning, and in some embodiments refers to a video codec-managed data structure of reference frames.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Video decoder 30 may also include an inter-layer prediction unit 75. The inter-layer prediction unit 75 is configured to predict a current block (e.g., a current block in the EL) using one or more different layers that are available in SVC (e.g., a base or reference layer). Such prediction may be referred to as inter-layer prediction. Inter-layer prediction unit 75 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. When the base and enhancement layers have different spatial resolutions, spatial motion vector scaling and/or inter-layer position mapping may be performed by the inter-layer prediction unit 75 using a temporal scaling function, as described in greater detail below.

Inverse quantization unit 76 inverse quantizes, e.g., de-quantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that may be applied.

Inverse transform unit 78 applies an inverse transform, e.g., an inverse DCT, an inverse DST, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference frame memory 82, which stores reference pictures used for subsequent motion compensation. Reference frame memory 82 also stores decoded video for later presentation on a display device, such as display device 32 of FIG. 1.

Multi-Layer Decoder

Figure 3B:
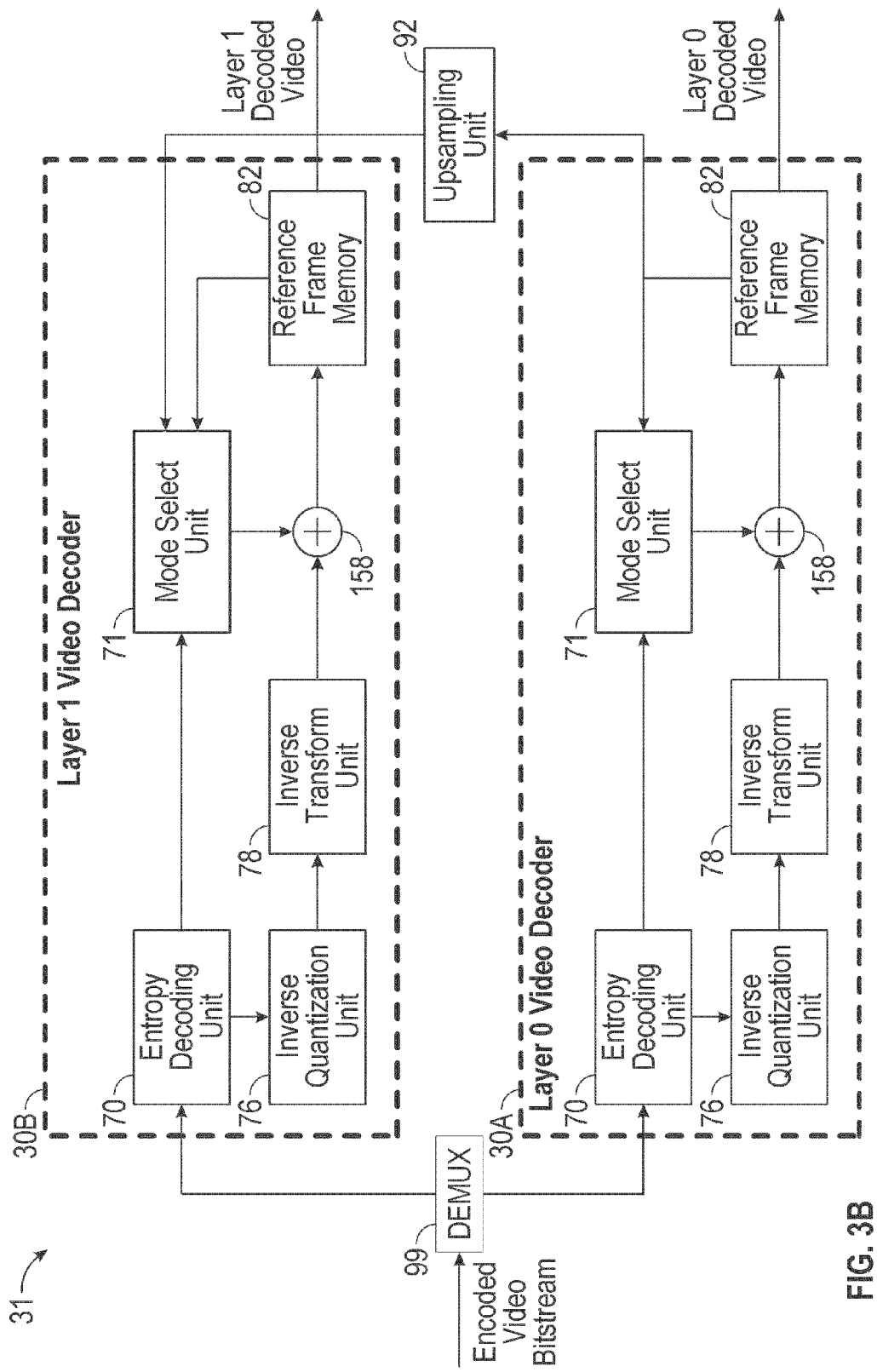
FIG. 3B is a block diagram illustrating an example of a multi-layer video decoder that may implement techniques in accordance with aspects described in this disclosure.

FIG. 3B is a block diagram illustrating an example of a multi-layer video decoder 31 that may implement techniques in accordance with aspects described in this disclosure. The video decoder 31 may be configured to process multi-layer video frames, such as for SHVC and multiview coding. Further, the video decoder 31 may be configured to perform any or all of the techniques of this disclosure.

The video decoder 31 includes a video decoder 30A and video decoder 30B, each of which may be configured as the video decoder 30 of FIG. 3A and may perform the functions described above with respect to the video decoder 30. Further, as indicated by the reuse of reference numbers, the video decoders 30A and 30B may include at least some of the systems and subsystems as the video decoder 30. Although the video decoder 31 is illustrated as including two video decoders 30A and 30B, the video decoder 31 is not limited as such and may include any number of video decoder 30 layers. In some embodiments, the video decoder 31 may include a video decoder 30 for each picture or frame in an access unit. For example, an access unit that includes five pictures may be processed or decoded by a video decoder that includes five decoder layers. In some embodiments, the video decoder 31 may include more decoder layers than frames in an access unit. In some such cases, some of the video decoder layers may be inactive when processing some access units.

In addition to the video decoders 30A and 30B, the video decoder 31 may include an upsampling unit 92. In some embodiments, the upsampling unit 92 may upsample a base layer of a received video frame to create an enhanced layer to be added to the reference picture list for the frame or access unit. This enhanced layer may be stored in the reference frame memory 82 (e.g., in its decoded picture buffer, etc.). In some embodiments, the upsampling unit 92 may include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer (or reference frame memory) 82 of the lower layer decoder (e.g., the video decoder 30A) and to upsample the picture (or the received picture information). This upsampled picture may then be provided to the mode select unit 71 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer (reference frame memory) 82 of the video decoder 30A may be provided directly, or at least without being provided to the upsampling unit 92, to the mode select unit 71 of the video decoder 30B. For example, if video data provided to the video decoder 30B and the reference picture from the decoded picture buffer (reference frame memory) 82 of the video decoder 30A are of the same size or resolution, the reference picture may be provided to the video decoder 30B without upsampling. Further, in some embodiments, the upsampling unit 92 may be a resampling unit 90 (see FIG. 2B) configured to upsample or downsample a reference picture received from the decoded picture buffer (reference frame memory) 82 of the video decoder 30A.

As illustrated in FIG. 3B, the video decoder 31 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 31, such as from a processor on the destination device 14. The control signal may be generated based on the resolution or bitrate of a video from the input interface 28, based on a bandwidth of the channel 16, based on a subscription associated with a user (e.g., a paid subscription versus a free subscription), or based on any other factor for determining a resolution obtainable by the video decoder 31.

Quadtree Structure

Figure 4A:
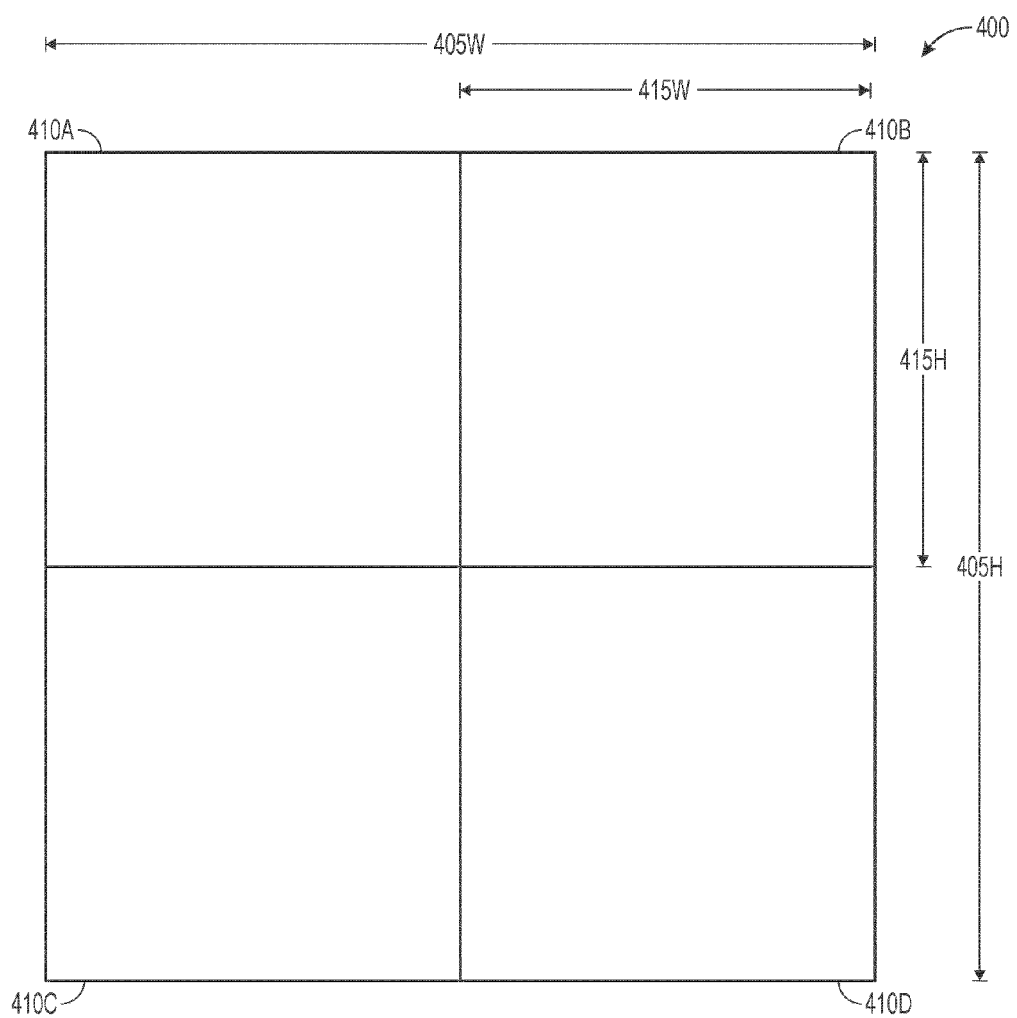
FIG. 4A is an illustration of an example inter-layer reference picture that has been partitioned (e.g., by a video encoder) into a quadtree structure comprising four equal quadtree leafs.

FIG. 4A illustrates an example inter-layer reference picture 400 that has been partitioned (e.g., by the video encoder 20) into a quadtree structure including four equal quadtree leafs 410A-410D (collectively referred to as 410). In other embodiments, the inter-layer reference picture 400 may be partitioned into partitioning arrangements different from a quadtree leaf structure. In one embodiment, the inter-layer reference picture 400 may comprise an up-sampled version of a base layer with the same spatial resolution. The inter-layer reference picture 400 includes an inter-layer reference picture width 405W and an inter-layer reference picture height 405H. Similarly, each of the quadtree leafs 410 has a width 415W and a height 415H. In one embodiment, in an example 4K (e.g., 3840×2160 pixels) picture, the inter-layer reference picture width 405W may comprise 3,840 pixels, and the inter-layer reference picture height 405H may comprise 2,160 pixels. In this example, the quadtree leaf width 415W may comprise 1,920 pixels, and the quadtree leaf height 415H may comprise 1,080 pixels. In some embodiments, the video encoder 20 may further partition each of the quadtree leafs 410 into quadtree sub-leafs based on various depth specifications, as described in relation to FIGS. 4B and 4C. In other embodiments, the video encoder 20 may partition the inter-layer reference picture 400 based on a smallest coding unit size or a largest coding unit size.

As discussed above, the quadtree structure of the inter-layer reference picture 400 may allow the video encoder 20 to signal specific inter-component filter parameters for each quadtree leaf 410, rather than signaling one set of filter parameters for the entire inter-layer reference picture 400. As described above, filter parameters may include one or more of filter coefficients, quantization parameters, shift parameters, and/or any other parameters. In some embodiments, the entire picture or portions of the picture may share the same or similar specific filter parameters. In other embodiments, the entire picture or portions of the picture may share a portion of the specific filter parameters (e.g., quantization parameters) while other specific filter parameters may differ (e.g., filter coefficients). In either case, the video encoder 20 may determine which, and to what extent, spatially neighboring quadtree leafs 410 share specific filter parameters. For example, the video encoder 20 may determine that some or all of the specific filter parameters for the quadtree leaf 410A are the same or similar as some or all of the specific filter parameters for the quadtree leaf 410B. In that case, to increase efficiency, the video encoder 20 may signal some or all of the filter parameters to one of the quadtree leafs 410A or 410B and merge (e.g., by signaling a merge operation) quadtree leafs 410A and 410B so that they may share some or all of the signaled filter parameters. Alternatively, the video encoder 20 may signal some or all of the filter parameters (e.g., only the quantization parameters and the shift parameters) to a parent node (e.g., the quadtree root node) of several child nodes (e.g., the quadtree leafs 410A-410D) but signal other filter parameters (e.g., the filter coefficients) to each of the child nodes separately. Alternatively, base information may be signaled at a root node and related delta (e.g., differential) information may be signaled at its quadtree leafs. In other embodiments, multiple (e.g., more than two) quadtree leafs 410 (or quadtree sub-leafs, as described below in relation to FIG. 4B) may share some or all of the same or similar specific filter parameters. In that case, the video encoder 20 may similarly increase efficiency by merging the multiple quadtree leafs and/or quadtree sub-leafs and signaling a portion of one set of some or all of the filter parameters for their use. In one embodiment, quadtree leafs and/or sub-leafs may be merged to their immediate-left or immediate-above neighboring quadtree leafs and/or sub-leafs. In this example, the video encoder 20 may signal the merge operation in a bitstream. In other embodiments, the merge operation may be signaled for each leaf and/or sub-leaf. In yet other embodiments, the video encoder 20 may signal the inter-component filter parameters at a largest coding unit (CU) level, at a smallest coding unit (CU) level, in a Sequence Parameter Set (SPS), in a Picture Parameter Set (PPS), and/or at a largest prediction unit (PU) level. For example, in the case of a large picture (e.g., a 4K resolution picture), it may be more efficient for the video encoder 20 to signal the filter parameters to each of the largest coding units, rather than to each of a plurality of quadtree leafs.

In relation to the video encoder 20 signaling inter-component filter parameters, a parameter function (e.g., inter_comp_filter_param(idx)) may be associated with several variables and/or parameters. For example, a inter_comp_filter_cb_flag[idx] function and/or a inter_comp_filter_cr_flag[idx] function may specify (via their index) whether filter parameters may be signaled for a particular quadtree partition. For example, if these example function indices are equal to 1, the video encoder 20 may signal filter parameters for the Cb and Cr pixels (respectively). Alternatively, if these example function indices are equal to 0, the video encoder 20 may not signal filter parameters for the Cb and Cr pixels (respectively). As a further example, a abs_multi_factor_cb_minus1[idx] function and a abs_multi_factor_cr_minus1[idx] function may specify (via their index) absolute values for $Q_{Cb}$ and $Q_{Cr}$ (in relation to Equations 7 and 8 above), respectively, for a quadtree partition idx. In one embodiment, when these functions are not present, their values may be inferred as zeroes. Similarly, a sign_multi_factor_cb[idx] function and a sign_multi_factor_cr[idx] function may specify (via their index) a sign of $Q_{Cb}$ and $Q_{Cr}$, respectively. In one embodiment, when these functions are not present, their values may be inferred as zeroes. Similarly, a shift_cb[idx] function and a shift_cr[idx] function may specify (via their index) values for $N_{Cb}$ and $N_{Cr}$ (in relation to Equations 7 and 8 above), respectively, for the quadtree partition idx. In one embodiment, when these functions are not present, their values may be inferred as a predefined value, e.g., 15. As discussed above in relation to FIG. 1, the video encoder 20 may signal filter coefficients in an 8-point cross-shaped fashion. In that case, for example, a inter_comp_filter_cb[idx][i] function and a inter_comp_filter_cr[idx][i] function may specify the first seven coefficients of the 8-point cross for the Cb and Cr pixels, respectively. In this example, the 8th coefficient may be inferred as the negative value of the sum of the first 7 coefficients. In one embodiment, when these functions are not present, they may be inferred as zeroes.

An example inter_comp_filter_param(idx) function may include, at least:

TABLE 1

Example syntax

| | Descriptor |
| --- | --- |
| inter_comp_filter_param(idx ) { | |
|   inter_comp_filter_cb_flag[idx] | u(1) |
|   if(inter_comp_filter_flag[ idx]) { | |
|     abs_multi_factor_cb_minus1[idx] | u(10) |
|     sign_multi_factor_cb[idx] | u(1) |
|     shift_cb[idx] | u(5) |
|     for(i=0;i<=7;i++) | |
|       inter_comp_filter_cb[idx][ i] | s(4) |
|   } | |
|   inter_comp_filter_cr_flag[idx] | u(1) |

TABLE 1-continued

Example syntax

| | Descriptor |
|---|---|
| if(inter_comp_filter_cr_flag[idx]) { | |
|     abs_multi_factor_cr_minus1[idx] | u(10) |
|     sign_multi_factor_cr[idx] | u(1) |
|     shift_cr[idx] | u(5) |
|     for(i=0;i<=7;i++) | |
|         inter_comp_filter_cr[idx][i] | s(4) |
| } | |
| } | | where some of the variables and parameters may be further described below in relation to FIG. 4B.

As further discussed above in relation to FIG. 1, the video encoder 20 may signal the inter-component filter parameters via, for example, a slice header or Adaptation Parameter Sets (APS) at the picture level. It may be beneficial for the video encoder 20 to use the slice header or APS for signaling filter parameters that vary (e.g., differentiate) frequently, for example, quantization parameters and/or filter coefficients. In one embodiment, when the video encoder 20 signals certain filter parameters in a slice header, all slices within the same picture may share the same certain filter parameters. In some embodiments, it may not be necessary for the video encoder 20 to signal some or all of the inter-component filter parameters for each picture. For example, the coefficients of an 8-point cross shaped filter and/or shift parameters may not require updating for each picture. In that case, the video encoder 20 may signal such filter parameters as default values in a Sequence Parameter Set (SPS) and/or a Picture Parameter Set (PPS). To increase efficiency, the video encoder 20 may only signal a difference (e.g., a differential) for the default values when applicable.

In relation to the video encoder 20 signaling differentials for some filter parameters (e.g., a multiplication factor and/or a shift factor, which may be differentially coded), the parameter function (e.g., inter_comp_filter_param(idx)) may be modified and associated with several variables and/or parameters. For example, a delta_multi_factor_cb[idx] function and a delta_multi_factor_cr[idx] function may specify a delta (e.g., a differential) for $Q_{Cb}$ and $Q_{Cr}$ (in relation to Equations 7 and 8) for the quadtree partition idx. The differential may be calculated in relation to an immediate-left, an immediate-above, and/or an immediate-above-and-left quadtree leaf. In one embodiment, if no neighboring quadtree leafs exist in these positions, the differential may be zero. In one embodiment, when the functions are not present, their values may also be inferred to be zero. Similarly, a delta_shift_cb[idx] function and a delta_shift_cr[idx] function may specify a delta (e.g., a differential) for $N_{Cb}$ and $N_{Cr}$ (in relation to Equations 7 and 8) for the quadtree partition idx. The differential may be calculated in relation to an immediate-left, an immediate-above, and/or an immediate-above-and-left quadtree leaf. In one embodiment, if no neighboring quadtree leafs exist in these positions, the differential may be zero. In one embodiment, when the functions are not present, their values may also be inferred to be zero.

An example modified inter_comp_filter_param(idx) function may include:

TABLE 2

Example syntax

Figure 4B:
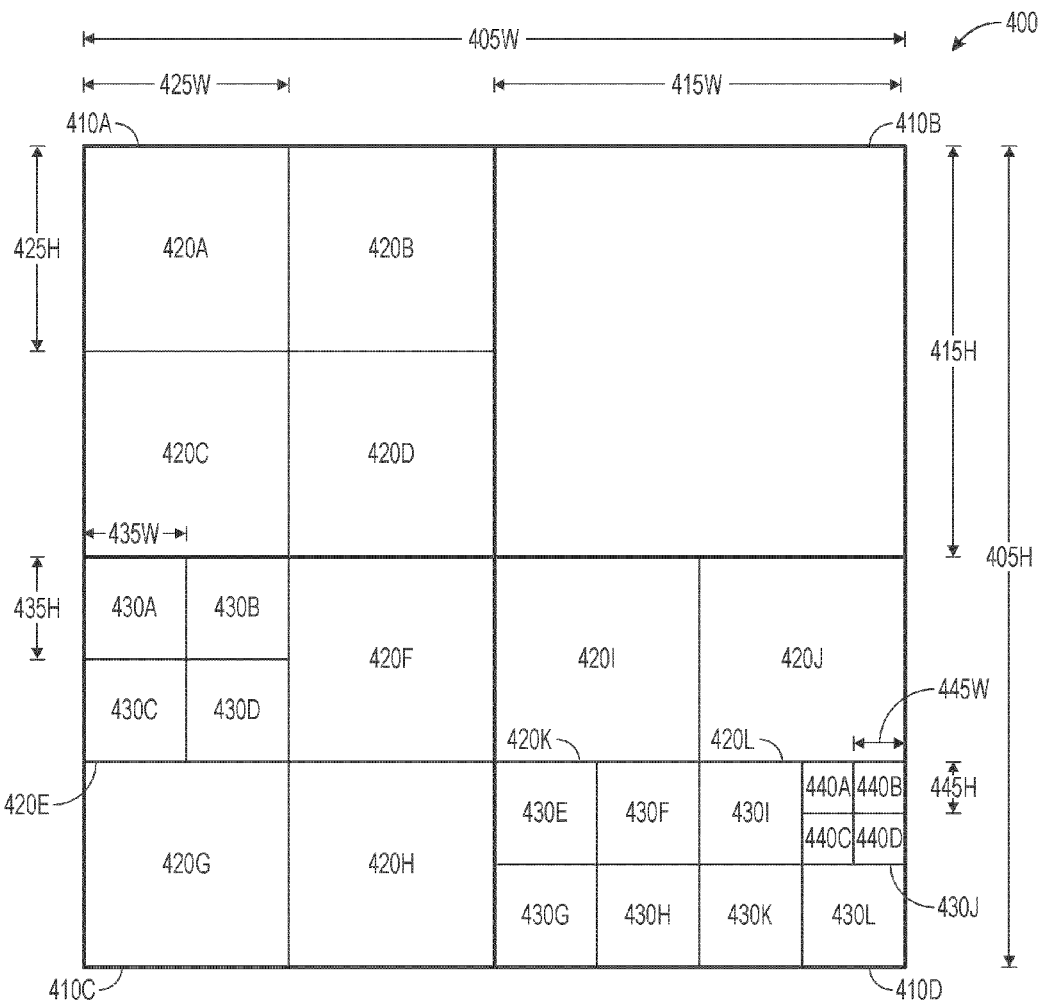
FIG. 4B is an illustration of the inter-layer reference picture of FIG. 4A having been partitioned into further quadtree sub-leafs.

| | Descriptor |
|---|---|
| inter_comp_filter_param(idx) { | |
|     inter_comp_filter_cb_flag[idx] | u(1) |
|     if(inter_comp_filter_flag[idx]) { | |
|         delta_multi_factor_cb[idx] | s(10) |
|         delta_shift_cb[idx] | s(5) |
|         for(i=0;i<=7;i++) | |
|             inter_comp_filter_cb[idx][i] | s(4) |
|     } | |
|     inter_comp_filter_cr_flag[idx] | u(1) |
|     if(inter_comp_filter_cr_flag[idx]) { | |
|         delta_multi_factor_cr[idx] | s(10) |
|         delta_shift_cr[idx] | s(5) |
|         for(i=0;i<=7;i++) | |
|             inter_comp_filter_cr[idx][i] | s(4) |
|     } | |
| } | | where some of the variables and parameters may be further described above and/or may be described below in relation to FIG. 4B.

In relation to the video encoder 20 merging quadtree leafs to their immediate-left or immediate-above neighboring quadtree leafs and/or sub-leafs, a slice header function (e.g., slice_header( )) may be associated with several variables and/or parameters. For example, a slice_max_inter_comp_quadtree_depth variable may represent a maximum quadtree depth, as discussed further in relation to FIG. 4B. Additionally, a quadtree_merge_idc[idx] variable may represent an index to specify whether neighboring quadtrees share common filter parameters. In one embodiment, the index of quadtree_merge_idc[idx] may be within the range of [0, 2], inclusively, and may be coded with truncated unary coding. For example, an index of 0 may indicate that the inter-component filter parameters of the current quadtree partition of the same as those of its left neighbor. Further, an index of 1 may indicate that the filter parameters of the current quadtree partition are the same as those of its top neighbor.

Further, an index of 2 may indicate that the filter parameters of the current quadtree partition may be signaled by the video encoder 20.

An example slice_header( ) function may include:

TABLE 3

Example syntax

| | Descriptor |
|---|---|
| slice_header( ) { | |
|     ... | |
|     slice_max_inter_comp_quadtree_depth | te(v) |
|     MaxPartNum=1<<(2* slice_max_inter_comp_quadtree_depth) | |
|     for(idx=0;idx< MaxPartNum;idx++) { | |

TABLE 3-continued

Example syntax

| | Descriptor |
|---|---|
| quadtree_merge_idc[idx]<br>if(quadtree_merge_idc[idx]==2)<br>   inter_comp_filter_param(idx )<br>}<br>...<br>} | te(v) | where some of the variables and parameters may be further described above and/or may be described below in relation to FIG. 4B.

Similarly, when the inter-layer reference picture 400 includes more than one partition (e.g., when it has been partitioned into quadtree leafs, such as the quadtree leafs 410), the video encoder 20 may use filter parameters of one quadtree partition to predict filter parameters of another quadtree partition. For example, the video encoder 20 may signal filter parameters to the quadtree leaf 410A and then, based on those filter parameters, "predict" the filter parameters to be used for the quadtree leaf 410B. This process may increase coding efficiency by enabling the video encoder 20 to only signal differential filter parameter information (if any) to the quadtree leaf 410B. In other embodiments, some or all of the inter-component filter parameters may be predefined (e.g., hardcoded) such that the video encoder 20 may signal an index set of filter parameters in the bitstream.

Quadtree Depth

FIG. 4B illustrates the inter-layer reference picture 400 (as described in relation to FIG. 4A) having been partitioned into further quadtree sub-leafs (e.g., 420A-420L, collectively referred to as 420). In this example, some of the quadtree sub-leafs have been further partitioned into further quadtree sub-leafs (e.g., 430A-430L, collectively referred to as 430). Additionally, in this example, one further quadtree sub-leaf (e.g., 430J) has been even further partitioned into even further quadtree sub-leafs (e.g., 440A-440D, collectively referred to as 440). In other embodiments, the quadtree leafs may be partitioned (or not partitioned) in any number of other ways, depending on the content within the quadtree leafs and/or depending on a target quadtree depth as discussed in relation to FIG. 4C. As described above in relation to FIG. 4A, the inter-layer reference picture 400 comprises an inter-layer reference picture width 405W and an inter-layer reference picture height 405H, and each of the quadtree leafs 410 comprise a quadtree leaf width 415W and a quadtree leaf height 415H. Similarly, each of the quadtree sub-leafs 420 comprise a quadtree sub-leaf width 425W and a quadtree sub-leaf height 425H. In the example of a 4K (e.g., 3840×2160 pixels) picture, the quadtree sub-leaf width 425W may comprise 960 pixels, and the quadtree sub-leaf height 425H may comprise 540 pixels. Similarly, each of the quadtree sub-leafs 430 and 440 comprise a quadtree sub-leaf width 435W and 445W, respectively, and a quadtree sub-leaf height 435H and 445H, respectively. In the example of the 4K (e.g., 3840×2160 pixels) picture, the quadtree sub-leaf width 435W and 445W may comprise 480 pixels and 240 pixels, respectively, and the quadtree sub-leaf height 435H and 445H may comprise 270 pixels and 135 pixels, respectively. In the described examples, the video encoder 20 may determine the quadtree partition sizes based on pixel values. For example, a 1-depth quadtree may evenly partition a whole picture (e.g., the inter-layer reference picture 400) into four parts in a 2×2 manner (e.g., such as in the partition arrangement as illustrated in FIG. 4A). In other embodiments, the video encoder 20 may determine the quadtree partition sizes and/or the quadtree partition based on a smallest coding unit or a largest coding unit. As further described below, the quadtree structure may be represented by one or more of a quadtree depth, a splitting flag that may be signaled for the node with depth less than the quadtree depth, and/or a merge operation that may be signaled for each quadtree leaf node to indicate whether to merge to its neighboring partition.

As mentioned above, in some embodiments, the video encoder 20 may continue to further partition each of the quadtree sub-leafs into further quadtree sub-leafs based on a splitting flag (e.g., one for each split) or based on any of a number of other partitioning and/or depth specifications as described above and below. The extent to which the video encoder 20 partitions the inter-layer reference picture 400 into quadtree leafs and/or sub-leafs may be referred to as a "quadtree depth." If necessary, according to quadtree depth specifications, the video encoder 20 may continue to further partition each of the further quadtree sub-leafs until each pixel of the picture is contained within its own quadtree sub-leaf.

In some embodiments, the video encoder 20 may partition some, but not all, of the quadtree leafs and/or quadtree sub-leafs into further quadtree sub-leafs. For example, depending on quadtree depth specifications, as illustrated, the video encoder 20 may further partition the quadtree sub-leaf 420E into further quadtree sub-leafs but not further partition the quadtree sub-leaf 420F. In one embodiment, video encoder 20 may signal the quadtree depth at the sequence level so that all leafs share the same quadtree depth. In another embodiment, the video encoder 20 may signal the quadtree depth for each leaf individually. In that case, the video encoder 20 may also signal a maximum quadtree depth at the sequence level so that entropy coding of the quadtree depth at the picture level may be more efficient. In one embodiment, to avoid redundancy, the video encoder 20 may group similarly featured leafs (e.g., those that may share some or all filter parameters that are equal or similar) into "regions" so that the video encoder 20 may signal one quadtree depth for the entire region. In yet another embodiment, the maximum quadtree depth may be hard-coded in a codec. In still yet another embodiment, the video encoder 20 may signal the quadtree depth using a split flag. In that case, the video encoder 20 may signal the split flag to each leaf and/or sub-leaf until the maximum quadtree depth is reached for each leaf and/or sub leaf. For example, in the illustrated example, the video encoder 20 may signal a split flag to indicate a partition for the first layer of the picture (e.g., the entire inter-layer reference picture 400), which may result in each of the quadtree leafs 410. The video encoder 20 may then signal a split flag to indicate that the first quadtree leaf (e.g., 410A) should be partitioned, which may result in the quadtree sub-leafs 420, as illustrated as one example. The video encoder 20 may then signal a split flag to indicate that the second quadtree leaf (e.g., 420B) should not be partitioned, as illustrated as one example. This process may continue until all of the quadtree leads and/or sub-leafs have been fully partitioned according to depth specifications, as illustrated as one example in the figure.

In the event that the video encoder 20 signals the maximum quadtree depth in a Sequence Parameter Set (SPS), the quadtree depth and related inter-component filter parameters may be updated at the picture level, e.g., in the slice header, which may be modified as described below. Example syntax (e.g., seq_parameter_set_rbsp( )) may include a seq_max_inter_comp_quadtree_depth parameter (with ue(v) descriptor), which may specify a maximum quadtree depth at the sequence level. In one embodiment, the seq_max_inter_comp_quadtree_depth variable may have a range of [0, 2]. Example syntax includes:

TABLE 4

| Example syntax | Descriptor |
| --- | --- |
| seq_parameter_set_rbsp( ) { | |
| ... | |
| seq_max_inter_comp_quadtree_depth | ue(v) |
| ... | |
| } | |

Example syntax for signaling the maximum quadtree depth may include:

TABLE 5

| Example syntax | Descriptor |
| --- | --- |
| slice_header( ) { | |
| ... | |
| slice_max_inter_comp_quadtree_depth | te(v) |
| MaxPartNum=1<<(2* slice_max_inter_comp_quadtree_depth) | |
| for(idx=0;idx<MaxPartNum;idx++) | |
|   inter_comp_filter_param(idx ) | |
| ... | |
| } | | where the slice_max_inter_comp_quadtree_depth variable may specify a maximum quadtree depth for the current picture (e.g., within a range of [0, seq_max_inter_comp_quadtree_depth], inclusively, and where some of the variables and parameters may be further described above in relation to FIG. 4A.

Target Quadtree Depth

Figure 4C:
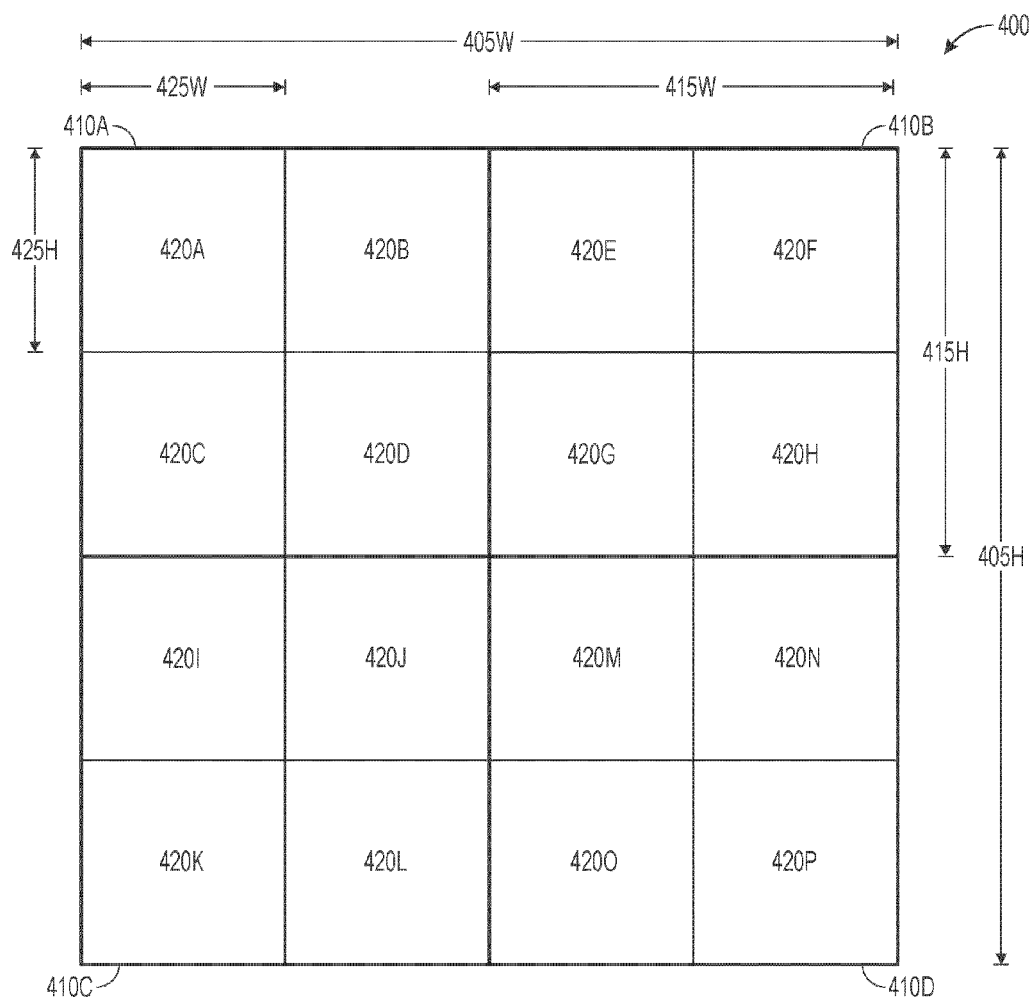
FIG. 4C is another illustration of the inter-layer reference picture of FIG. 4A having been partitioned into further quadtree sub-leafs.

FIG. 4C illustrates the inter-layer reference picture 400 (as described in relation to FIG. 4A) having been partitioned into further quadtree sub-leafs (e.g., 420A-420P, collectively referred to as 420). As described above, the video encoder 20 may partition the inter-layer reference picture 400 according to a target quadtree depth, M, where M is a positive integer. In some embodiments, partitioning the inter-layer reference picture 400 in this way may reduce coding complexity but may require more bits. In the example of a quadtree leaf partitioning arrangement (e.g., as illustrated in FIGS. 4A-4C), after partitioning is complete, the inter-layer reference picture 400 may have $4^M$ equal-sized quadtree leaf partitions. For example, in the partition arrangement illustrated in FIG. 4A, the target quadtree depth may be 1, resulting in $4^1=4$ equal-sized quadtree leaf partitions arranged in a 2×2 manner (e.g., 410A-410D). In the example illustrated in FIG. 4C, the target quadtree depth may be 2, resulting in $4^2=16$ equal-sized quadtree leaf partitions arranged in a 4×4 manner (e.g., 420A-420P). As described above in relation to FIG. 4A, the inter-layer reference picture 400 comprises an inter-layer reference picture width 405W and an inter-layer reference picture height 405H, and each of the quadtree leafs 410 comprise a quadtree leaf width 415W and a quadtree leaf height 415H. Similarly, each of the quadtree sub-leafs 420 comprise a quadtree sub-leaf width 425W and a quadtree sub-leaf height 425H. The video encoder 20 may continue to equally partition the quadtree leaf partitions until the target quadtree depth is reached. For example, if the target quadtree depth equals 3, then the video encoder 20 may partition the inter-layer reference picture 400 to have $4^3=64$ equal-sized quadtree leaf partitions arranged in an 8×8 manner (not pictured).

Chroma and Luma Pixel Arrangement

Figure 5A:
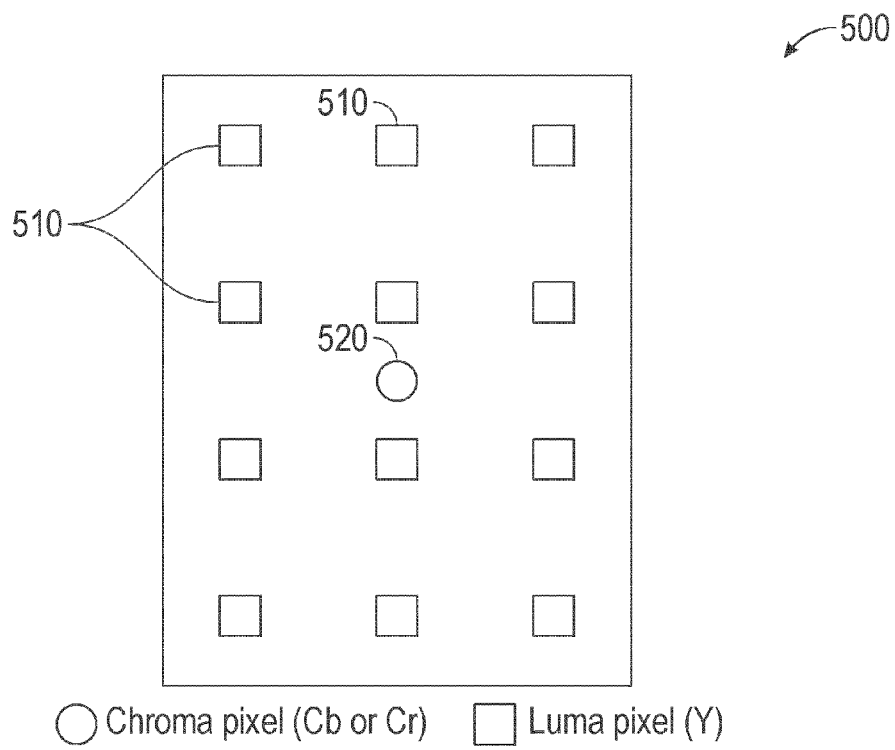
FIG. 5A is an illustration of an example chroma and luma arrangement in an example partitioning arrangement.

FIG. 5A illustrates an example chroma and luma arrangement in an example partitioning arrangement 500. In one embodiment, the partitioning arrangement 500 may be a quadtree leaf structure, as described above. In the example of the partitioning arrangement 500 comprising a quadtree leaf structure, the example partitioning arrangement 500 may represent one portion of one of the quadtree leafs and/or sub-leafs (as described in relation to FIGS. 4A-4C and hereinafter referred to as quadtree leafs collectively). Each of the quadtree leafs may contain multiple chroma pixels, and the illustrated example partitioning arrangement 500 may include one of the chroma pixels (e.g., a chroma pixel 520, represented by a circle, which may comprise a Cb chroma pixel and/or a Cr chroma pixel) located in one particular quadtree leaf. The example partitioning arrangement 500 may further include luma pixels 510, represented by squares in this illustration, which may be "related" to the corresponding chroma pixel 520. In one embodiment, the illustrated luma pixels 510 may be located within the same quadtree leaf as the chroma pixel 520. In other embodiments, one or more of the luma pixels 510 may be located within other quadtree leafs. In this example, the illustrated relative chroma and luma pixel positions may represent a 4:2:0 color subsampling format, wherein a 3×4 set of "related" luma pixels 510 surround the chroma pixel 520. In other embodiments, the chroma and luma pixels may be arranged in any number of other color subsampling formats (e.g., 4:4:4, 4:2:2, etc.). In some embodiments, the video encoder 20 may determine inter-component filter parameters based on properties of the chroma pixel 520 and/or the luma pixels 510 for use in enhancing the chroma pixel 520, as further described above and below in relation to FIG. 5B.

Filter Parameter Signaling and Padding

Figure 5B:
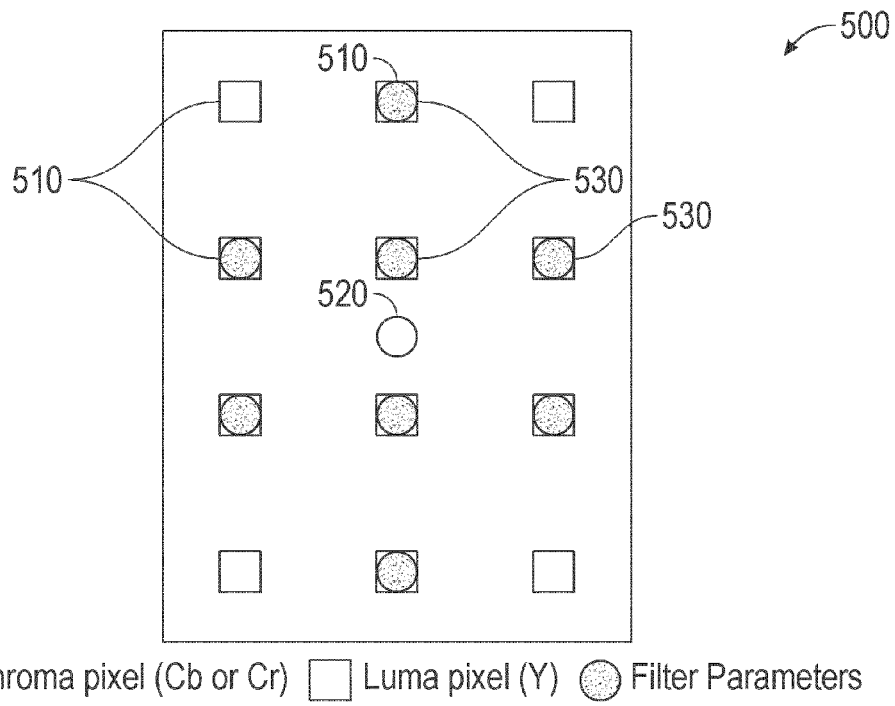
FIG. 5B illustrates the example chroma and luma arrangement in the example partitioning arrangement of FIG. 5A including an arrangement of signaled filter parameters.

FIG. 5B illustrates the example chroma and luma arrangement in the example partitioning arrangement 500 (which may represent one portion of one quadtree leaf and/or sub-leaf as described in relation to FIG. 5A) including an arrangement of signaled filter parameters 530. As described above, each of the square icons represent a luma pixel 510, and the separate circle icon represents a chroma pixel 520, which may comprise a Cb chroma pixel and/or a Cr chroma pixel. The patterned circle icons that lie within the luma pixels 510 represent a placement of the signaled filter parameters 530 as arranged around the chroma pixel 520. In this example, the signaled filter parameters 530 arrangement represents an 8-point cross-shape filter format as applied to a 4:2:0 color subsampling format, as further described above. In other embodiments, the signaled filter parameters 530 may be arranged in different patterns, for example, in a 3×4 arrangement, in which each of the illustrated luma pixels 510 may receive a signaled filter parameter 530. Furthermore, in other embodiments, the chroma and luma may be arranged in any number of other color subsampling formats (e.g., 4:4:4, 4:2:2, etc.).

As described above in relation to equations 5-14, in some embodiments, the video encoder 20 may determine the filter parameters 530 (e.g., $f_{Cb}$) based on properties of the chroma pixel 520 and the luma pixels 510. As described above, the filter parameters 530 may include one or more of filter coefficients, quantization parameters, shift parameters, and/or any other parameters. The video encoder 20 may then signal and use the filter parameters 530 to determine a chroma offset value (e.g., o(x, y)). In one embodiment, the video encoder 20 may use the filter parameters 530 to filter each of a specific pattern of luma pixels 510 (e.g., the 8-point cross-shape filter format as illustrated in FIG. 5B) "related" to the corresponding chroma pixel 520. Finally, the video encoder 20 may add the chroma offset value to a previously up-sampled chroma pixel 520 value (e.g., Cb(x, y)) to obtain an enhanced chroma pixel value (e.g., $Cb_{enh}(x, y)$). In the event that the partitioning arrangement 500 comprises both a Cb chroma pixel 520 and a Cr chroma pixel 520, the video encoder 20 may perform all of the above for each of the Cb and Cr chroma pixels separately and signal one set of filter parameters for each. In any case, when the video encoder 20 has performed the above steps for one chroma pixel 520, the video encoder 20 may repeat the process for another chroma pixel, for example, a chroma pixel located to the right of the chroma pixel 520 (not pictured).

As described above, a chroma pixel 520 may be near a border of a quadtree leaf. In that case, the luma pixels to the left of or above the chroma pixel 520, for example when parallel processing such as "tile" is enabled, may be located in neighboring quadtree leafs, e.g., they may be "cross-boundary" or "unavailable" luma pixels. In such a case, in one embodiment, the video encoder 20 may perform inter-component filtering by replacing (e.g., "padding") the values of the cross-boundary (e.g., "unavailable") luma pixels using the values of in-boundary luma pixels. For example, if the luma pixel immediately to the left of the chroma pixel 520 lies in a neighboring quadtree (e.g., it is cross-boundary), then the video encoder 20 may pad the values of that luma pixel using the values of the closest luma pixel to the right of the chroma pixel 520 (e.g., one that is in-boundary). In another example, if the luma pixel immediately above the chroma pixel 520 lies in a neighboring quadtree, then the video encoder 20 may pad the values of that luma pixel using the values of the closest luma pixel below the chroma pixel 520. In one embodiment, the video encoder 20 may use the values of the luma pixels when performing calculations as described in relation to Equations 5, 6, 11, and 12 above. The described padding process may be similar to the padding process as used in motion compensation or re-sampling. In other embodiments, the video encoder 20 may generate the cross-boundary luma pixels using a method similar to "border extension" in motion compensation.

Figure 6:
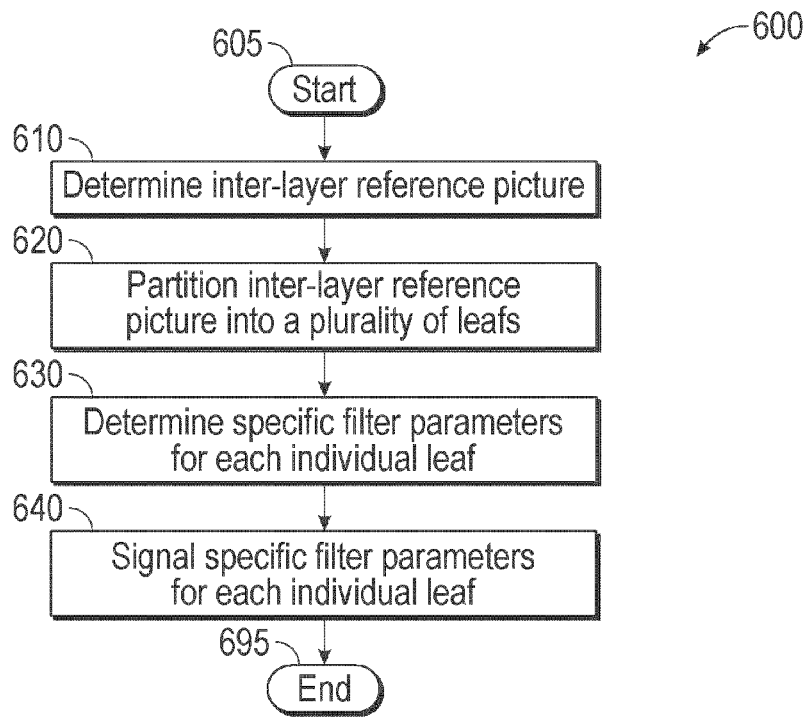
FIG. 6 is a flowchart illustrating an example method or process for partitioning an inter-layer reference picture into a plurality of leafs and signaling specific filter parameters for each individual leaf.

Method of Partitioning an Inter-Layer Reference Picture into a Plurality of Leafs and Signaling Specific Filter Parameters for Each Individual Leaf FIG. 6 is a flowchart illustrating an example process 600 for partitioning an inter-layer reference picture (e.g., the inter-layer reference picture 400 of FIG. 4A and/or FIG. 4B) into a plurality of leafs (e.g., the quadtree leafs 410 and/or sub-leafs 420, 430, 440, etc. as described in relation to FIG. 4A and/or FIG. 4B) and signaling specific filter parameters for each individual leaf. As described above, filter parameters may include one or more of filter coefficients, quantization parameters, shift parameters, and/or any other parameters. In one embodiment, the process 600 may partition the inter-layer reference picture according to depth specifications (as described in relation to FIGS. 4B and/or 4C). The process 600 may be performed by an encoder (e.g., the video encoder 20 in relation to FIG. 2A), an inter-layer prediction unit (e.g., the inter-layer prediction unit 66 in relation to FIG. 2A), a partition unit (e.g., the partition unit 48 in relation to FIG. 2A), or any other component, depending on the embodiment. The blocks of the process 600 are described with respect to the video encoder 20, but the process 600 may be performed by other components. All embodiments described with respect to the process 600 may be implemented separately, or in combination with one another.

The process 600 starts at block 605. At block 610, the video encoder 20 may determine the inter-layer reference picture 400. In one embodiment, the video encoder 20 may determine the inter-layer reference picture 400 using the inter-layer prediction unit 66. In one embodiment, the video encoder 20 may generate the inter-layer reference picture 400, or in other embodiments, the video encoder 20 may retrieve the inter-layer reference picture 400 from a memory or load the inter-layer reference picture 400 into a memory.

At block 620, the video encoder 20 may partition the inter-layer reference picture 400 into a plurality of leafs, as further described in relation to FIG. 4A. In one embodiment, the plurality of leafs may be a quadtree structure comprising four equal quadtree leafs. In other embodiments, the plurality of leafs may comprise other partition structures. In some embodiments, the video encoder 20 may determine if depth specifications indicate further partitioning of the quadtree leafs 410 into further quadtree leafs and/or sub-leafs, as described in relation to FIG. 4B. In yet other embodiments, the video encoder 20 may partition the inter-layer reference picture 400 according to a target quadtree depth, as described in relation to FIG. 4B.

At block 630, the video encoder 20 may determine specific filter parameters for each individual leaf as described above. For example, the video encoder 20 may minimize the mean square error on a leaf-by-leaf basis and determine one or more of filter coefficients, quantization parameters, and/or shift parameters (e.g., collectively referred to as filter parameters, as described above). In some embodiments, the filter parameters may be specific (e.g., individualized) for each leaf based on the contents of each leaf. In other embodiments, the filter parameters may be the same for each leaf. In other embodiments, the video encoder 20 may determine if some quadtree leafs have similar characteristics to their surrounding quadtree leafs, allowing the video encoder 20 to merge those leafs and to send only one set of filter parameters to their merge, as further described in relation to FIG. 4A. In yet other embodiments, the video encoder 20 may determine a portion of the filter parameters as necessary and as described in relation to FIG. 4A. In one embodiment, the filter parameters may be determined by the inter-layer prediction unit 66.

At block 640, the video encoder 20 may signal the specific filter parameters for each individual leaf, as described above. In some embodiments, the video encoder 20 may signal the filter parameters in a bitstream, in a slice header, in an adaptation parameter set (APS), and/or any number of other methods of signaling as described in relation to FIG. 5B. The process ends at block 695.

Figure 7:
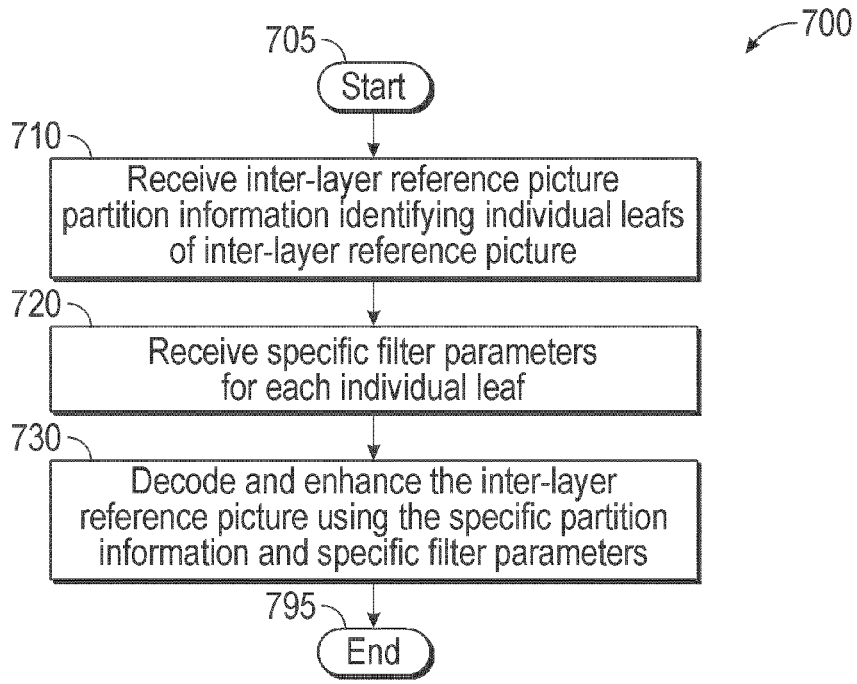
FIG. 7 is a flowchart illustrating an example method or process for decoding and enhancing an inter-layer reference picture using specific partition information and specific filter parameters.

Method of Decoding and Enhancing an Inter-Layer Reference Picture Using Specific Partition Information and Specific Filter Parameters FIG. 7 is a flowchart illustrating an example method or process 700 for decoding and enhancing an inter-layer reference picture (e.g., the inter-layer reference picture 400 of FIG. 4A and/or FIG. 4B) using specific partition information and specific filter parameters, as described above in relation to FIGS. 1, 3A, 5A, and 5B. In one embodiment, the specific partition information and the specific filter parameters may be received from a video encoder, such as the video encoder 20 described in relation to FIG. 6. The process 700 may be performed by a decoder (e.g., the video decoder 30 in relation to FIG. 3A), an inter-layer prediction unit (e.g., the inter-layer prediction unit 75 in relation to FIG. 3A), or any other component, depending on the embodiment. The blocks of the process 700 are described with respect to the video decoder 30, but the process 700 may be performed by other components. All embodiments described with respect to the process 700 may be implemented separately, or in combination with one another.

The process 700 starts at block 705. At block 710, the video decoder 30 may receive inter-layer reference picture 400 partition information identifying individual leafs (e.g., the quadtree leafs 410 and/or sub-leafs 420, 430, 440, etc. as described in relation to FIG. 4A and/or FIG. 4B) of the inter-layer reference picture 400. In one embodiment, the video decoder 30 may receive the inter-layer reference picture 400 partition information via a bitstream. As described above, partition information may be indicated via split flag bits, for example, and may further contemplate partitioning the inter-layer reference picture 400 into different levels of partition depth, as described in relation to FIG. 4B. Alternatively, partition information may be indicated by a target quadtree depth, for example, and may further contemplate partitioning the inter-layer reference picture 400 into equal sub-leafs until the target quadtree depth is reached, as described in relation to FIG. 4C.

At block 720, the video decoder 30 may receive the specific filter parameters for each individual leaf. In one embodiment, the video decoder 30 may receive the specific filter parameters via a bitstream. As described above, filter parameters may include one or more of filter coefficients, quantization parameters, shift parameters, and/or any other parameters. In one embodiment, the video decoder 30 may receive the specific filter parameters from a video encoder, for example, the video encoder 20 as described in relation to block 640 of FIG. 6.

At block 730, the video decoder 30 may decode and enhance the inter-layer reference picture 400 using the specific partition information and the specific filter parameters, as described above. For example, the video decoder 30 may use the specific filter parameters to improve the inter-layer reference picture 400 picture quality by enhancing chroma pixels in one or more of the individual leafs, as further described in relation to FIG. 5B. The process ends at block 795.

3-D Extension and Single Layer Coding

While the above disclosure has described particular embodiments, many variations are possible. For example, as mentioned above, the above techniques may be applied to single layer coding and/or 3-D video encoding. In some embodiments of 3-D video, a reference layer (e.g., a base layer) includes video information sufficient to display a first view of a video and the enhancement layer includes additional video information relative to the reference layer such that the reference layer and the enhancement layer together (e.g., a "base view") include video information sufficient to display a second view (e.g., a "dependent view") of the video. These two views may be used to generate a stereoscopic image. As discussed above, motion information from the reference layer may be used to identify additional implicit hypothesis when encoding or decoding a video unit in the enhancement layer, in accordance with aspects of the disclosure. This may provide greater coding efficiency for a single layer and/or 3-D video bitstream.

For example, in relation to 3-D video encoding, when inter-component filtering is applied, the video encoder 20 may predict chroma pixels of the dependent view using both luma and chroma components of the base view, rather than only the chroma components. As a more specific example, the video encoder 20 may use information from luma pixels in the base view in combination with Cr chroma pixels in the base view to predict Cr chroma pixels and/or Cb chroma pixels in the dependent view. Similarly, the video encoder 20 may use information from luma pixels in the base view in combination with Cb chroma pixels in the base view to predict Cr chroma pixels and/or Cb chroma pixels in the dependent view. In other words, the final chroma prediction (e.g., the undetermined Cb or Cr chroma at the dependent layer) may be determined using the sum of the prediction from a base-view chroma component (e.g., either a Cb or a Cr chroma component) and a high-frequency prediction from a base-view luma component. In some embodiments, the inter-component filtering may be switched on or off at any level of the bitstream, e.g., a slice level, a coding unit (CU) level, a prediction unit (PU) level, etc.

As another example, in relation to single layer coding (e.g., the range extension of HEVC), the bit-depth may be higher than in SVC (e.g., an increase from 12-bits to 16-bits), which may allow for greater chroma resolutions, e.g., 4:4:4. In that case, in some embodiments, inter-component filtering may be combined with inter-picture (e.g., temporal) prediction to determine a final chroma prediction. For example, the video encoder 20 may first determine inter-picture luma and chroma reference blocks (e.g., from a previous picture) during inter-picture prediction. In one embodiment, the inter-picture luma prediction may remain unchanged from other systems. The video encoder 20 may then apply inter-component filtering processes (as described above) to the luma reference block to obtain chroma high-frequency offset blocks (e.g., as described above in relation to filter parameters). The video encoder 20 may then add the chroma high-frequency offset blocks to the inter-picture chroma reference blocks, obtaining a final chroma prediction (e.g., for use in the current picture). In other words, similar to the 3-D extension, the video encoder 20 may predict final chroma components (e.g., of a current block) using both luma and chroma components (e.g., of a reference block), wherein the luma components provide high-frequency information. In some embodiments, to increase efficiency (e.g., to save bits), the video encoder 20 may signal only inter-component filter parameters of the collocated reference picture for the current picture. In some embodiments, the video encoder 20 may generate the filter parameters and signal them to each pair of reference pictures and current pictures. In other embodiments, the video encoder 20 may signal the filter parameters for a subset of the reference picture and current picture pairs. In that case, the video encoder 20 may not implement inter-component filtering for the reference picture and current picture pairs for which it does not signal filter parameters. In some embodiments, the inter-component filtering may be switched on or off at any level of the bitstream, e.g., a slice level, a coding unit (CU) level, a prediction unit (PU) level, etc.

Terminology

It is to be recognized that depending on the example, certain acts or events of any of the techniques described herein may be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodiment in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device 12 to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, which may be referred to as a "CODEC." Moreover, the techniques of this disclosure may also be performed by a video pre-processor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described. These and other embodiments are within the scope of the following claims.

Various embodiments of the invention have been described. These and other embodiments are within the scope of the following claims.

What is claimed is:

1. An apparatus configured to encode video information, the apparatus comprising:
  a memory unit configured to store an inter-layer reference picture comprising video information; and
  a processor operationally coupled to the memory and configured to:
    partition the inter-layer reference picture into a quadtree structure having:
    (i) a plurality of leafs, wherein each of the plurality of leafs includes an associated chroma pixel, and (ii) a plurality of luma pixels associated with the chroma pixel;

determine inter-component filter parameters shared by a subset of the plurality of leafs based on a property of the chroma pixel and a property of one or more of the plurality of luma pixels;

determine inter-component filter parameters specific to each individual leaf based on a property of the chroma pixel and a property of one or more of the plurality of luma pixels, wherein the shared inter-component filter parameters or the specific inter-component filter parameters comprise at least one of a high-pass filter coefficient, a quantization parameter, or a shift parameter; and signal the shared inter-component filter parameters for a parent node of the subset of the plurality of leafs and signal the specific inter-component filter parameters for each of the leafs.

2. The apparatus of claim 1, wherein the processor is further configured to partition the inter-layer reference picture based on picture resolution, smallest coding unit size, largest coding unit size, or tile size of the inter-layer reference picture.

3. The apparatus of claim 1, wherein the processor is further configured to merge a selected leaf with a spatial neighbor leaf of the selected leaf such that the selected leaf and the spatial neighbor leaf share the same inter-component filter parameters.

4. The apparatus of claim 1, wherein the processor is further configured to use quadtree depth information to indicate a quadtree partitioning of the quadtree structure.

5. The apparatus of claim 1, wherein at least one of a filter coefficient, quantization parameter, or a shift parameter are the same for a plurality of the leafs.

6. The apparatus of claim 1, wherein the processor is configured to signal the inter-component filter parameters in a slice header, an adaptation parameter set (APS), a picture parameter set (PPS) or a sequence parameter set (SPS).

7. The apparatus of claim 1, wherein the processor is configured to signal the inter-component filter parameters by signaling differential information indicating a difference between two inter-component filter parameters associated with different leafs.

8. The apparatus of claim 1, wherein the processor is configured to signal the inter-component filter parameters by signaling one or more index values of predefined filter parameter sets.

9. A method of encoding video information, the method comprising:

storing an inter-layer reference picture comprising video information;

partitioning the inter-layer reference picture into a quadtree structure having: (i) a plurality of leafs, wherein each of the plurality of leafs includes an associated chroma pixel, and (ii) a plurality of luma pixels associated with the chroma pixel;

determining inter-component filter parameters shared by a subset of the plurality of leafs based on a property of the chroma pixel and a property of one or more of the plurality of luma pixels;

determining inter-component filter parameters specific to each individual leaf based on a property of the chroma pixel and a property of one or more of the plurality of luma pixels, wherein the shared inter-component filter parameters or the specific inter-component filter parameters comprise at least one of a high-pass filter coefficient, a quantization parameter, or a shift parameter; and signaling the shared inter-component filter parameters for a parent node of the subset of the plurality of leafs and signaling the specific inter-component filter parameters for each of the leafs.

10. The method of claim 9, wherein said partitioning comprises partitioning the inter-layer reference picture based on picture resolution, smallest coding unit size, largest coding unit size, or tile size of the inter-layer reference picture.

11. The method of claim 9, further comprising merging a selected leaf with a spatial neighbor leaf of the selected leaf such that the selected leaf and the spatial neighbor leaf share the same inter-component filter parameters.

12. The method of claim 9, further comprising using a quadtree depth information to indicate a quadtree partitioning of the quadtree structure.

13. The method of claim 9, wherein at least one of a filter coefficient, quantization parameter, or a shift parameter are the same for a plurality of the leafs.

14. The method of claim 9, wherein said signaling comprises signaling the inter-component filter parameters by signaling differential information indicating a difference between two inter-component filter parameters associated with different leafs.

15. The method of claim 9, wherein said signaling comprises signaling the inter-component filter parameters by signaling one or more index values of predefined filter parameter sets.

16. An apparatus configured to decode video information, the apparatus comprising:

a memory unit configured to store an inter-layer reference picture comprising video information; and a processor operationally coupled to the memory and configured to:

determine partition information indicating a quadtree structure having: (i) a plurality of leafs into which the inter-layer reference picture is partitioned, wherein each of the plurality of leafs includes an associated chroma pixel, and (ii) a plurality of luma pixels associated with the chroma pixel;

determine inter-component filter parameters shared by a subset of the plurality of leafs for a parent node of the subset of the plurality of leafs;

determine inter-component filter parameters specific to each individual leaf, wherein the shared inter-component filter parameters for the parent node and the specific inter-component filter parameters for each individual leaf are based on a property of the chroma pixel and a property of one or more of the plurality of luma pixels and comprise at least one of a high-pass filter coefficient, a quantization parameter, or a shift parameter; and decode the inter-layer reference picture using the partition information and the shared and specific inter-component filter parameters.

17. The apparatus of claim 16, wherein the partition information of the inter-layer reference picture is based on picture resolution, smallest coding unit size, largest coding unit size, or tile size of the inter-layer reference picture.

18. The apparatus of claim 16, wherein the processor is further configured to merge a selected leaf with a spatial neighbor leaf of the selected leaf such that the selected leaf and the spatial neighbor leaf share the same inter-component filter parameters.

19. The apparatus of claim 16, wherein the processor is further configured to use a quadtree depth information to determine a quadtree partitioning of the quadtree structure.

20. The apparatus of claim 16, wherein at least one of a filter coefficient, quantization parameter, or a shift parameter are the same for a plurality of the leafs.

21. The apparatus of claim 16, wherein the processor is configured to receive the inter-component filter parameters from a slice header, an adaptation parameter set (APS), a picture parameter set (PPS) or a sequence parameter set (SPS).

22. The apparatus of claim 16, wherein the processor is configured to determine the inter-component filter parameters by receiving differential information indicating a difference between two inter-component filter parameters associated with different leafs.

23. The apparatus of claim 16, wherein the processor is configured to determine the inter-component filter parameters by receiving one or more index values of predefined filter parameter sets.

24. A method of decoding video information, the method comprising:
storing an inter-layer reference picture comprising video information;
determining partition information indicating a quadtree structure having: (i) a plurality of leafs into which the inter-layer reference picture is partitioned, wherein each of the plurality of leafs includes an associated chroma pixel, and (ii) a plurality of luma pixels associated with the chroma pixel;
determining inter-component filter parameters shared by a subset of the plurality of leafs for a parent node of the subset of the plurality of leafs;
determining inter-component filter parameters specific to each individual leaf, wherein the shared inter-component filter parameters for the parent node and the specific inter-component filter parameters for each individual leaf are based on a property of the chroma pixel and a property of one or more of the plurality of luma pixels and comprise at least one of a high-pass filter coefficient, a quantization parameter, or a shift parameter; and
decoding the inter-layer reference picture using the partition information and the shared and specific inter-component filter parameters.

25. The method of claim 24, wherein said partition information of the inter-layer reference picture is based on picture resolution, smallest coding unit size, largest coding unit size, or tile size of the inter-layer reference picture.

26. The method of claim 24, further comprising merging a selected leaf with a spatial neighbor leaf of the selected leaf such that the selected leaf and the spatial neighbor leaf share the same inter-component filter parameters.

27. The apparatus of claim 24, wherein the processor is further configured to use a quadtree depth information to determine a quadtree partitioning of the quadtree structure.

28. The method of claim 24, wherein at least one of a filter coefficient, quantization parameter, or a shift parameter are the same for a plurality of the leafs.

29. The method of claim 24, wherein said determining the inter-component filter parameter comprises receiving differential information indicating a difference between two inter-component filter parameters associated with different leafs.

30. The method of claim 24, wherein said determining the inter-component filter parameters comprises receiving one or more index values of predefined filter parameter sets.

* * * * *